US008063994B2

(12) United States Patent
Owaki et al.

(10) Patent No.: US 8,063,994 B2
(45) Date of Patent: Nov. 22, 2011

(54) IMAGE PROCESSING DEVICE, IMAGE PROCESSING METHOD, PROGRAM, RECORDING MEDIUM AND INTEGRATED CIRCUIT

(75) Inventors: Yoshiaki Owaki, Osaka (JP); Yasuhiro Kuwahara, Osaka (JP)

(73) Assignee: Panasonic Corporation, Osaka (JP)

( * ) Notice: Subject to any disclaimer, the term of this patent is extended or adjusted under 35 U.S.C. 154(b) by 610 days.

(21) Appl. No.: 12/300,713

(22) PCT Filed: Apr. 16, 2007

(86) PCT No.: PCT/JP2007/058279

§ 371 (c)(1),
(2), (4) Date: Nov. 13, 2008

(87) PCT Pub. No.: WO2007/135822

PCT Pub. Date: Nov. 29, 2007

(65) Prior Publication Data

US 2009/0128693 A1 May 21, 2009

(30) Foreign Application Priority Data

May 23, 2006 (JP) ................................ 2006-142492

(51) Int. Cl.
*H04N 1/405* (2006.01)
*H04N 1/409* (2006.01)
*H04N 5/21* (2006.01)

(52) U.S. Cl. ........ 348/607; 348/701; 348/910; 348/606; 348/627; 358/3.03; 382/275

(58) Field of Classification Search .................. 348/607, 348/606, 620, 627, 622, 701, 909, 910, 441; 358/3.03, 3.05, 3.04, 2.1; 382/236, 275, 382/237; 375/240.27
See application file for complete search history.

(56) References Cited

U.S. PATENT DOCUMENTS

| | | | | |
|---|---|---|---|---|
| 5,596,349 | A | 1/1997 | Kobayashi et al. | |
| 2005/0254094 | A1 * | 11/2005 | Kuwahara et al. | 358/2.1 |
| 2009/0195493 | A1 * | 8/2009 | Fujiyoshi | 345/100 |

FOREIGN PATENT DOCUMENTS

| | | |
|---|---|---|
| JP | 6-161382 | 6/1994 |

(Continued)

OTHER PUBLICATIONS

International Search Report issued Jul. 3, 2007 in the International (PCT) Application No. PCT/JP2007/058279.

*Primary Examiner* — Jefferey Harold
*Assistant Examiner* — Jean W Desir
(74) *Attorney, Agent, or Firm* — Wenderoth, Lind & Ponack, L.L.P.

(57) ABSTRACT

Flicker occurs in a flicker-noticeable area consisting of pixels with no pixel value variations. An image processing device (100) includes a variance calculation unit (101) that obtains a variance of an area consisting of a target pixel and neighboring pixels included in a first frame, and changes, according to the variance, the rate at which an error generated at the target pixel through tone level restriction is distributed within the frame and between frames. The image processing device (100) includes an error diffusion unit (113) that distributes the error generated at the target pixel to the neighboring pixels included in the first frame based on an intra-frame error diffusion rate and an intra-frame error distribution weight, and distributes the error generated at the target pixel to a target pixel and neighboring pixels included in the second frame based on an inter-frame error diffusion rate and an inter-frame error distribution weight.

18 Claims, 12 Drawing Sheets

FOREIGN PATENT DOCUMENTS

| | | |
|---|---|---|
| JP | 9-50266 | 2/1997 |
| JP | 10-207425 | 8/1998 |
| JP | 2000-155561 | 6/2000 |
| JP | 2000-155565 | 6/2000 |
| JP | 3305669 | 5/2002 |
| JP | 2005-106888 | 4/2005 |

* cited by examiner

| | | |
|---|---|---|
| −1 | −1 | −1 |
| −1 | 8 | −1 |
| −1 | −1 | −1 |

IMAGE PROCESSING DEVICE, IMAGE PROCESSING METHOD, PROGRAM, RECORDING MEDIUM AND INTEGRATED CIRCUIT

TECHNICAL FIELD

The present invention relates to an image processing device that performs error diffusion when converting a video signal having M levels of tone to a video signal having N levels of tone (where N<M, and M and N are natural numbers).

BACKGROUND ART

When a video signal having M levels of tone is input into a display device that can display a video signal having up to N levels of tone (N<M) (M and N are natural numbers), the display device cannot display (express) all information of the M tone levels of the input signal. In that case, the display device, such as a plasma display device, uses a technique for expressing a video image corresponding to the input video signal as faithfully as possible only using the tone levels that can be displayed with the device. Error diffusion is one such technique (one such process).

Error diffusion is to distribute (diffuse) an error that is generated through tone level restriction at a pixel of an I-th frame (I is a natural number) or at a pixel of a frame preceding the I-th frame to other pixels (unprocessed pixels) of the I-th frame at which tone level restriction is yet to be performed and to pixels of an (I+1)th frame or frames following the (I+1)th frame. This technique enables the tone levels that cannot be displayed with the display device to be expressed using a plurality of other pixels in a spatial direction (pixels within the same frame) and a plurality of other pixels in a temporal direction (pixels at the same position in different frames and their neighboring pixels). This technique enables the display device to produce a video image with good reproducibility of tone levels.

However, one problem associated with this technique is that flicker may occur when an error generated in the I-th frame is distributed to the (I+1)th and following frames. Flicker occurs when the error accumulates through repeated distribution, and can cause pixels of one frame to have values different from the values of the corresponding pixels of the preceding and following frames. For ease of explanation, error diffusion is assumed to be performed only in the temporal direction. In this case, as shown in FIG. 2, the pixels of the I-th to the (I+3)th frames at the same position each have a pixel value of 40, whereas the corresponding pixel of the (I+4)th frame has a pixel value of 50. Such pixel value deviation causes flicker to occur in a video image displayed by the display device.

To overcome this problem, one method proposes to reduce unnecessary noise and reduce flicker by calculating the absolute value of a difference between a current video signal (a target pixel) and a video signal (pixel) delayed in each of a horizontal direction, a vertical direction, and a temporal direction of an image formed using the current video signal, determining that a smaller absolute value of the difference between the signals means that the two signals have a higher correlation, and distributing an error of the target pixel at a higher rate to a pixel determined to have a higher correlation with the target pixel (see, for example, Patent Citation 1).

FIG. 17 shows the conventional technique (conventional image processing device (error diffusion device)) described in Patent Citation 1.

A dot storage unit 102, a line storage unit 103, and a frame storage unit 1401 shown in FIG. 17 delay an input signal (input video signal), and calculate a difference between a target pixel and its corresponding pixel in each of a horizontal direction, a vertical direction, and a frame direction (temporal direction). Although the term "field" refers to a group of video signals in Patent Citation 1, the components in FIG. 17 use the term "frame" to replace the field because whether to use a frame or a field is not essential to the technique.

Absolute value calculation units 1409A to 1409C each calculate the absolute value of an input difference, and output the calculated absolute value to a weight determination unit 1404.

The weight determination unit 1404 receives the absolute values of the differences output from the absolute value calculation units 1409A to 1409C, and calculates a weighting coefficient of each pixel in a manner that the error generated at the target pixel is distributed at a higher rate to a pixel having a smaller absolute value of the difference from the target pixel.

An error addition unit 105 adds an error to the input signal, which is delayed to adjust its processing timing, and outputs the resulting signal to a tone level restriction unit 1406.

The tone level restriction unit 1406 outputs, to a dot error storage unit 14071, a line error storage unit 14072, and a frame error storage unit 1408, the upper n bits of the input signal to which the error has been added ((m+n)-bit signal) as an output signal (output video signal) and the lower m bits of the signal as an error element.

Each of the dot error storage unit 14071, the line error storage unit 14072, and the frame error storage unit 1408 receives the error element output from the tone level restriction unit 1406. Each of the dot error storage unit 14071, the line error storage unit 14072, and the frame error storage unit 1408 first delays the error element and then multiplies the error element by its weighting coefficient to generate a weighted error element, and outputs the weighted error element to the error addition unit 105.

Patent Citation 1: Japanese Unexamined Patent Publication No. 2000-155565

DISCLOSURE OF INVENTION

Technical Problem

However, the conventional image processing device with the above-described structure determines the error distribution rate based on the absolute value of the difference of each pixel from the target pixel. The device with this structure may distribute, for example, the error uniformly to pixels of a plurality of consecutive frames when the consecutive frames consist of pixels with the same pixel values. The error, which is distributed to different frames, accumulates through repeated distribution (the distributed error value increases), and may cause pixels of one frame to have values different from the values of the corresponding pixels of the preceding and following frames. This phenomenon will be seen as flicker (flicker on the display screen).

Also, to determine the relationship between pixels of two different frames, the conventional device is required to store information corresponding to at least one frame. The conventional device is accordingly required to have large memory and involve long delay time (long input-to-output processing time).

To solve such problems with the conventional technique, it is an object of the present invention to provide an image processing device, an image processing method, a program, a recording medium, and an integrated circuit that achieve good reproducibility of tone levels and reduce flicker while requiring smaller memory and involving shorter delay time.

Technical Solution

A first aspect of the present invention provides an image processing device that diffuses an error generated at a target pixel when converting a first video signal having M tone levels to a second video signal having N tone levels by restricting the tone levels of the first video signal to the N tone levels, where N<M, and M and N are natural numbers. The device includes a pixel variation information obtaining unit, a weight determination unit, and an error diffusion unit. The pixel variation information obtaining unit obtains pixel variation information based on a degree of pixel value variation using pixel values in a predetermined area consisting of a target pixel included in a first frame that is formed using a first video signal and two or more neighboring pixels of the target pixel. The weight determination unit determines, based on the pixel variation information, an intra-frame error distribution rate that is used to distribute an error generated at the target pixel within the first frame and an inter-frame error distribution rate that is used to distribute the error generated at the target pixel to a second frame different from the first frame, and determines, based on the intra-frame error distribution rate and the inter-frame error distribution rate, an intra-frame error distribution weight that is used to weight each of the neighboring pixels that are included in the first frame and an inter-frame error distribution weight that is used to weight a target pixel that is included in the second frame and is at a position identical to a position of the target pixel included in the first frame and neighboring pixels that are included in the second frame and are at positions identical to the neighboring pixels included in the first frame. The error diffusion unit distributes the error generated at the target pixel to the neighboring pixels included in the first frame based on the intra-frame error distribution rate and the intra-frame error distribution weight, and distributes the error generated at the target pixel to the target pixel included in the second frame and the neighboring pixels included in the second frame based on the inter-frame error distribution rate and the inter-frame error distribution weight.

In this image processing device, the pixel variation information obtaining unit obtains the pixel variation information of the area consisting of the target pixel included in the first frame and its neighboring pixels. The image processing device then changes the rate at which an error generated at the target pixel through tone level restriction is distributed within the same frame or between different frames based on the obtained pixel variation information. In this image processing device, the error diffusion unit distributes the error generated at the target pixel to the neighboring pixels included in the first frame based on the intra-frame error distribution rate and the intra-frame error distribution weight, and distributes the error generated at the target pixel to the target pixel included in the second frame and the neighboring pixels included in the second frame based on the inter-frame error distribution rate and the inter-frame error distribution weight.

The image processing device with this structure distributes no error to different frames (frames other than the first frame) in an area (image area) consisting of pixel values with small pixel value variations, and reduces flicker in a flicker-noticeable area consisting of pixels with small pixel value variations (flicker occurring in a video image formed using a video signal displayed by a display device). Also, the image processing device distributes the error to different frames in areas other than such a flicker-noticeable area and expresses tone levels using a plurality of frames (for example, a plurality of frames following the first frame). This improves the reproducibility of tone levels of a video signal processed by the image processing device.

The image processing device calculates a value using the degree of pixel value variation of the area consisting of the target pixel and its neighboring pixels. This enables the image processing device to estimate the degree of pixel value variation of a frame other than the first frame through calculation performed only within the first frame. As a result, the image processing device requires smaller memory, and involves shorter delay time (processing time).

Also, the image processing device diffuses (distributes) the error within the second frame, or more specifically to a target pixel included in the second frame and neighboring pixels included in the second frame. When, for example, eight pixels in the second frame that are at the upper left of the target pixel in the second frame, immediately above the target pixel, at the upper right of the target pixel, left to the target pixel, right to the target pixel, at the lower left of the target pixel, immediately below the target pixel, and at the lower right of the target pixel are used as the neighboring pixels in the second frame, the image processing device can diffuse the error in a balanced manner centering on the target pixel included in the second frame. A conventional image processing device that performs error diffusion has difficulties in diffusing an error to a pixel positioned in an upper left direction with respect to a target pixel. The conventional image processing device therefore fails to diffuse an error in a balanced manner centering on the target pixel, whereas the image processing device of the present invention can diffuse an error in a balanced manner centering on a target pixel.

A second aspect of the present invention provides the image processing device of the first aspect of the present invention in which the error diffusion unit includes a first multiplier, a second multiplier, an intra-frame error storage unit, an inter-frame error storage unit, and an error addition unit. The first multiplier multiplies, for each neighboring pixel to which the error is distributed within the first frame, a result of multiplication of the intra-frame error distribution rate and the intra-frame error distribution weight that are determined by the weight determination unit by the error generated at the target pixel. The second multiplier multiplies, for each of the target pixel included in the second frame and the neighboring pixels included in the second frame, a result of multiplication of the inter-frame error distribution rate and the inter-frame error distribution weight that are determined by the weight determination unit by the error generated at the target pixel. The intra-frame error storage unit stores a result of the multiplication performed by the first multiplier together with information about a pixel position of each neighboring pixel to which the error is distributed within the first frame. The inter-frame error storage unit stores a result of the multiplication performed by the second multiplier together with information about a pixel position of each of the target pixel included in the second frame and the neighboring pixels included in the second frame to which the error is distributed within the second frame. The error addition unit adds, to a pixel to which an error is to be added, an error that is stored in the intra-frame error storage unit as an error to be added to a pixel at a pixel position identical to a pixel position of the target pixel when a pixel position of the pixel to which the error is to be added coincides with the pixel position of any of the neighboring pixels stored in the intra-frame error storage unit, and adds, to a pixel to which an error is to be added, an error that is stored in the inter-frame error storage unit as an error to be added to a pixel at a pixel position identical to a pixel position of the target pixel when a pixel position of the pixel to which the error is to be added coincides with the pixel position of any of the target pixel included in the second frame and the neighboring pixels included in the second frame stored in the inter-frame error storage unit.

A third aspect of the present invention provides the image processing device of one of the first and second aspects of the present invention in which the second frame is a frame that follows the first frame.

A fourth aspect of the present invention provides the image processing device of one of the first to third aspects of the present invention in which a sum of the intra-frame error distribution rate and the inter-frame error distribution rate is 1.

A fifth aspect of the present invention provides the image processing device of one of the first to fourth aspects of the present invention in which the weight determination unit determines the inter-frame error distribution rate as 0 when a value of the pixel variation information obtained by the pixel variation information obtaining unit is smaller than a first threshold.

The image processing device with this structure diffuses an error within the same frame in an area in which flicker is more likely to occur, and therefore effectively reduces flicker.

A sixth aspect of the present invention provides the image processing device of one of the first to fifth aspects of the present invention in which the weight determination unit determines the inter-frame error distribution rate as a value greater than 0 when a value of the pixel variation information obtained by the pixel variation information obtaining unit is equal to or greater than a first threshold.

The image processing device with this structure diffuses an error between different frames in an area in which flicker is less likely to occur, and therefore effectively reduces flicker.

A seventh aspect of the present invention provides the image processing device of one of the first to sixth aspects of the present invention in which the weight determination unit determines the inter-frame error distribution rate as a smaller value as a value of the pixel variation information obtained by the pixel variation information obtaining unit is closer to a first threshold when the value of the pixel variation information is a value between the first threshold and a second threshold greater than the first threshold.

An eighth aspect of the present invention provides the image processing device of one of the first to seventh aspects of the present invention in which the pixel variation information obtaining unit calculates the pixel variation information based on a variance of pixel values in the predetermined area.

A ninth aspect of the present invention provides the image processing device of one of the first to seventh aspects of the present invention in which the pixel variation information obtaining unit calculates the pixel variation information based on a frequency element of the predetermined area.

A tenth aspect of the present invention provides the image processing device of one of the first to ninth aspects of the present invention, further including a brightness calculation unit. The brightness calculation unit calculates a brightness value that is a value based on brightness using pixel values of the pixels included in the predetermined area consisting of the target pixel and the neighboring pixels in the first frame. The weight determination unit determines the intra-frame error distribution rate, the inter-frame error distribution rate, the intra-frame error distribution weight, and the inter-frame error distribution weight based on the brightness value and the pixel variation information.

This image processing device changes the error distribution rate according to a value calculated using the degree of pixel value variation and a value calculated using the brightness. The image processing device with this structure can estimate a plurality of consecutive frames each including an area consisting of pixels with small pixel value variations in a dark part. The image processing device distributes no error between different frames when detecting this flicker noticeable condition (a plurality of consecutive frames each including an area consisting of pixels with small pixel value variations in a dark part), and therefore effectively reduces flicker occurring in a video image formed using a video signal (video image displayed by a display device).

An eleventh aspect of the present invention provides the image processing device of the tenth aspect of the present invention in which the weight determination unit determines the inter-frame error distribution rate as 0 when the brightness value is smaller than a third threshold.

A twelfth aspect of the present invention provides the image processing device of one of the tenth and eleventh aspects of the present invention in which the weight determination unit determines the inter-frame error distribution rate as a value greater than 0 when the brightness value is equal to or greater than a third threshold.

A thirteenth aspect of the present invention provides the image processing device of one of the tenth to twelfth aspects of the present invention in which the weight determination unit determines the inter-frame error diffusion rate as a smaller value as the brightness value is closer to a third threshold when the brightness value is a value between the third threshold and a fourth threshold greater than the third threshold.

A fourteenth aspect of the present invention provides the image processing device of one of the tenth to thirteenth aspects of the present invention in which the brightness calculation unit calculates the brightness value based on an average value of pixel values of the pixels included in the predetermined area.

A fifteenth aspect of the present invention provides a display device including the image processing device of one of the first to fourteenth aspects of the present invention.

A sixteenth aspect of the present invention provides a plasma display device including the image processing device of one of the first to fourteenth aspects of the present invention.

A seventeenth aspect of the present invention provides an image processing method for diffusing an error generated at a target pixel when converting a first video signal having M tone levels to a second video signal having N tone levels by restricting the tone levels of the first video signal to the N tone levels, where $N<M$, and M and N are natural numbers. The method includes a pixel variation information obtaining process, a weight determination process, and an error diffusion process. In the pixel variation information obtaining process, pixel variation information is obtained based on a degree of pixel value variation using pixel values in a predetermined area consisting of a target pixel included in a first frame that is formed using a first video signal and two or more neighboring pixels of the target pixel. In the weight determination process, an intra-frame error distribution rate that is used to distribute an error generated at the target pixel within the first frame and an inter-frame error distribution rate that is used to distribute the error generated at the target pixel to a second frame different from the first frame are determined based on the pixel variation information, and an intra-frame error distribution weight that is used to weight each of the neighboring pixels that are included in the first frame and an inter-frame error distribution weight that is used to weight a target pixel that is included in the second frame and is at a position identical to a position of the target pixel included in the first frame and neighboring pixels that are included in the second frame and are at positions identical to the neighboring pixels included in the first frame are determined based on the intra-frame error distribution rate and the inter-frame error distribution rate. In the error diffusion process, the error generated at the target pixel is distributed to the neighboring pixels included in the first frame based on the intra-frame error distribution rate and the intra-frame error distribution weight, and the error generated at the target pixel is distributed to the target pixel included in the second frame and the neighboring pixels included in the second frame based on the inter-frame error distribution rate and the inter-frame error distribution weight.

The image processing method has the same advantageous effects as the image processing device of the first aspect of the present invention.

An eighteenth aspect of the present invention provides a program enabling a computer to implement image processing of diffusing an error generated at a target pixel when converting a first video signal having M tone levels to a second video signal having N tone levels by restricting the tone levels of the first video signal to the N tone levels, where N<M, and M and N are natural numbers. The program enables the computer to function as a pixel variation information obtaining unit, a weight determination unit, and an error diffusion unit. The pixel variation information obtaining unit obtains pixel variation information based on a degree of pixel value variation using pixel values in a predetermined area consisting of a target pixel included in a first frame that is formed using a first video signal and two or more neighboring pixels of the target pixel. The weight determination unit determines, based on the pixel variation information, an intra-frame error distribution rate that is used to distribute an error generated at the target pixel within the first frame and an inter-frame error distribution rate that is used to distribute the error generated at the target pixel to a second frame different from the first frame, and determines, based on the intra-frame error distribution rate and the inter-frame error distribution rate, an intra-frame error distribution weight that is used to weight each of the neighboring pixels that are included in the first frame and an inter-frame error distribution weight that is used to weight a target pixel that is included in the second frame and is at a position identical to a position of the target pixel included in the first frame and neighboring pixels that are included in the second frame and are at positions identical to the neighboring pixels included in the first frame. The error diffusion unit distributes the error generated at the target pixel to the neighboring pixels included in the first frame based on the intra-frame error distribution rate and the intra-frame error distribution weight, and distributes the error generated at the target pixel to the target pixel included in the second frame and the neighboring pixels included in the second frame based on the inter-frame error distribution rate and the inter-frame error distribution weight.

The program has the same advantageous effects as the image processing device of the first aspect of the present invention.

A nineteenth aspect of the present invention provides a computer-readable recording medium storing a program that enables a computer to implement image processing of diffusing an error generated at a target pixel when converting a first video signal having M tone levels to a second video signal having N tone levels by restricting the tone levels of the first video signal to the N tone levels, where N<M, and M and N are natural numbers. The computer-readable recording medium stores the program enabling the computer to function as a pixel variation information obtaining unit, a weight determination unit, and an error diffusion unit. The pixel variation information obtaining unit obtains pixel variation information based on a degree of pixel value variation using pixel values in a predetermined area consisting of a target pixel included in a first frame that is formed using a first video signal and two or more neighboring pixels of the target pixel. The weight determination unit determines, based on the pixel variation information, an intra-frame error distribution rate that is used to distribute an error generated at the target pixel within the first frame and an inter-frame error distribution rate that is used to distribute the error generated at the target pixel to a second frame different from the first frame, and determines, based on the intra-frame error distribution rate and the inter-frame error distribution rate, an intra-frame error distribution weight that is used to weight each of the neighboring pixels that are included in the first frame and an inter-frame error distribution weight that is used to weight a target pixel that is included in the second frame and is at a position identical to a position of the target pixel included in the first frame and neighboring pixels that are included in the second frame and are at positions identical to the neighboring pixels included in the first frame. The error diffusion unit distributes the error generated at the target pixel to the neighboring pixels included in the first frame based on the intra-frame error distribution rate and the intra-frame error distribution weight, and distributes the error generated at the target pixel to the target pixel included in the second frame and the neighboring pixels included in the second frame based on the inter-frame error distribution rate and the inter-frame error distribution weight.

The computer-readable recording medium has the same advantageous effects as the image processing device of the first aspect of the present invention.

A twentieth aspect of the present invention provides an integrated circuit that diffuses an error generated at a target pixel when converting a first video signal having M tone levels to a second video signal having N tone levels by restricting the tone levels of the first video signal to the N tone levels, where N<M, and M and N are natural numbers. The integrated circuit includes a pixel variation information obtaining unit, a weight determination unit, and an error diffusion unit. The pixel variation information obtaining unit obtains pixel variation information based on a degree of pixel value variation using pixel values in a predetermined area consisting of a target pixel included in a first frame that is formed using a first video signal and two or more neighboring pixels of the target pixel. The weight determination unit determines, based on the pixel variation information, an intra-frame error distribution rate that is used to distribute an error generated at the target pixel within the first frame and an inter-frame error distribution rate that is used to distribute the error generated at the target pixel to a second frame different from the first frame, and determines, based on the intra-frame error distribution rate and the inter-frame error distribution rate, an intra-frame error distribution weight that is used to weight each of the neighboring pixels that are included in the first frame and an inter-frame error distribution weight that is used to weight a target pixel that is included in the second frame and is at a position identical to a position of the target pixel included in the first frame and neighboring pixels that are included in the second frame and are at positions identical to the neighboring pixels included in the first frame. The error diffusion unit distributes the error generated at the target pixel to the neighboring pixels included in the first frame based on the intra-frame error distribution rate and the intra-frame error distribution weight, and distributes the error generated at the target pixel to the target pixel included in the second frame and the neighboring pixels included in the second frame based on the inter-frame error distribution rate and the inter-frame error distribution weight.

The integrated circuit has the same advantageous effects as the image processing device of the first aspect of the present invention.

Advantageous Effects

The image processing device of the present invention changes the error distribution rate according to a value calculated using the degree of pixel value variation across an area consisting of a target pixel and its neighboring pixels. The image processing device with this structure distributes no error to different frames in an area consisting of pixels with small pixel value variations and reduces flicker in a flicker-noticeable area consisting of pixels with small pixel value variations. The image processing device distributes an error to different frames in areas other than such a flicker-noticeable area and expresses tone levels using a plurality of frames, and achieves good reproducibility of tone levels.

The image processing device determines a value using the degree of pixel value variation across an area consisting of a target pixel and its neighboring pixels, and can estimate the degree of pixel value variation of a different frame. The image processing device therefore requires smaller memory and involves shorter delay time.

EXPLANATION OF REFERENCE

Figure 1:
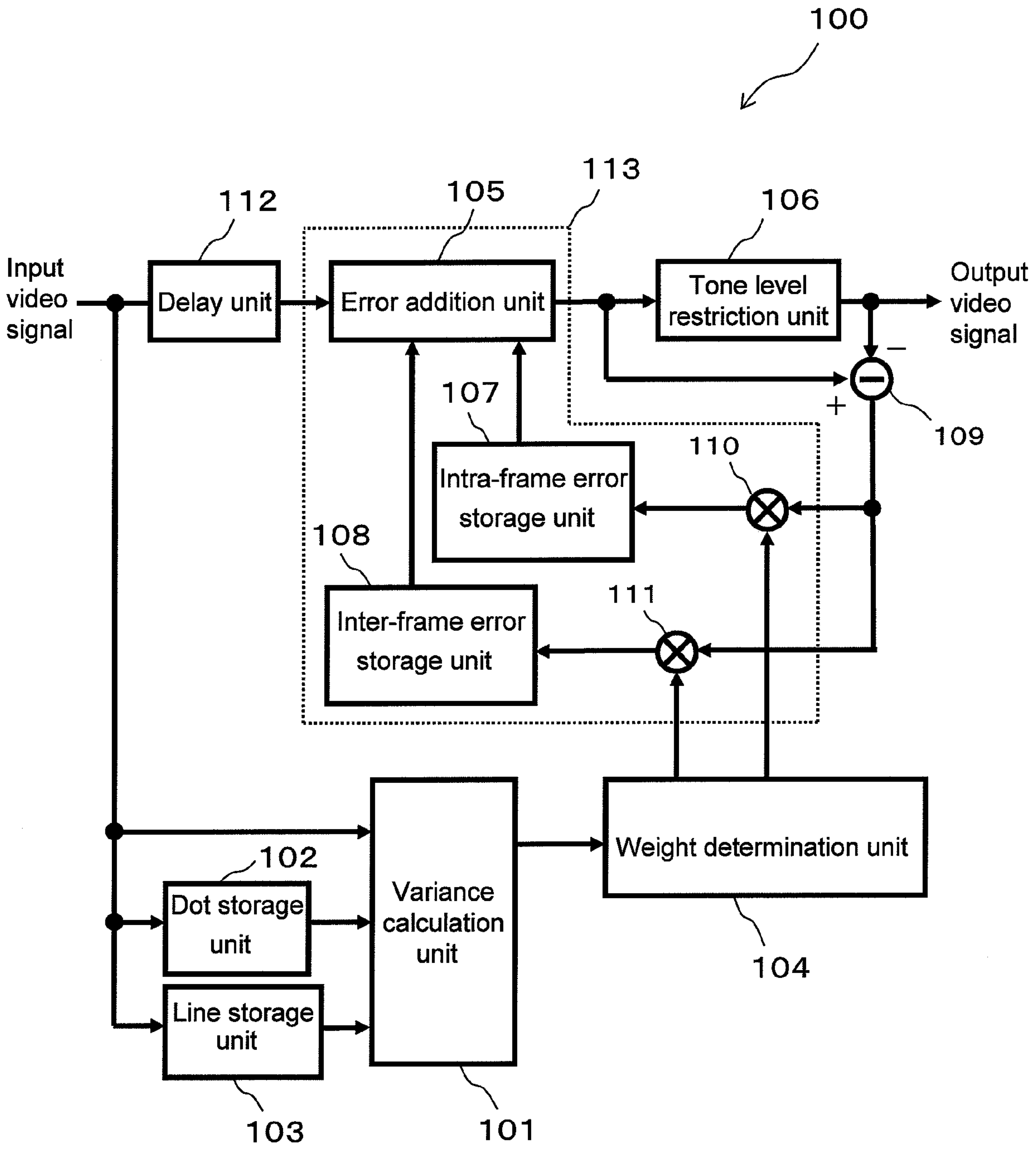
FIG. 1 is a block diagram of an image processing device according to a first embodiment of the present invention.
Figure 2:
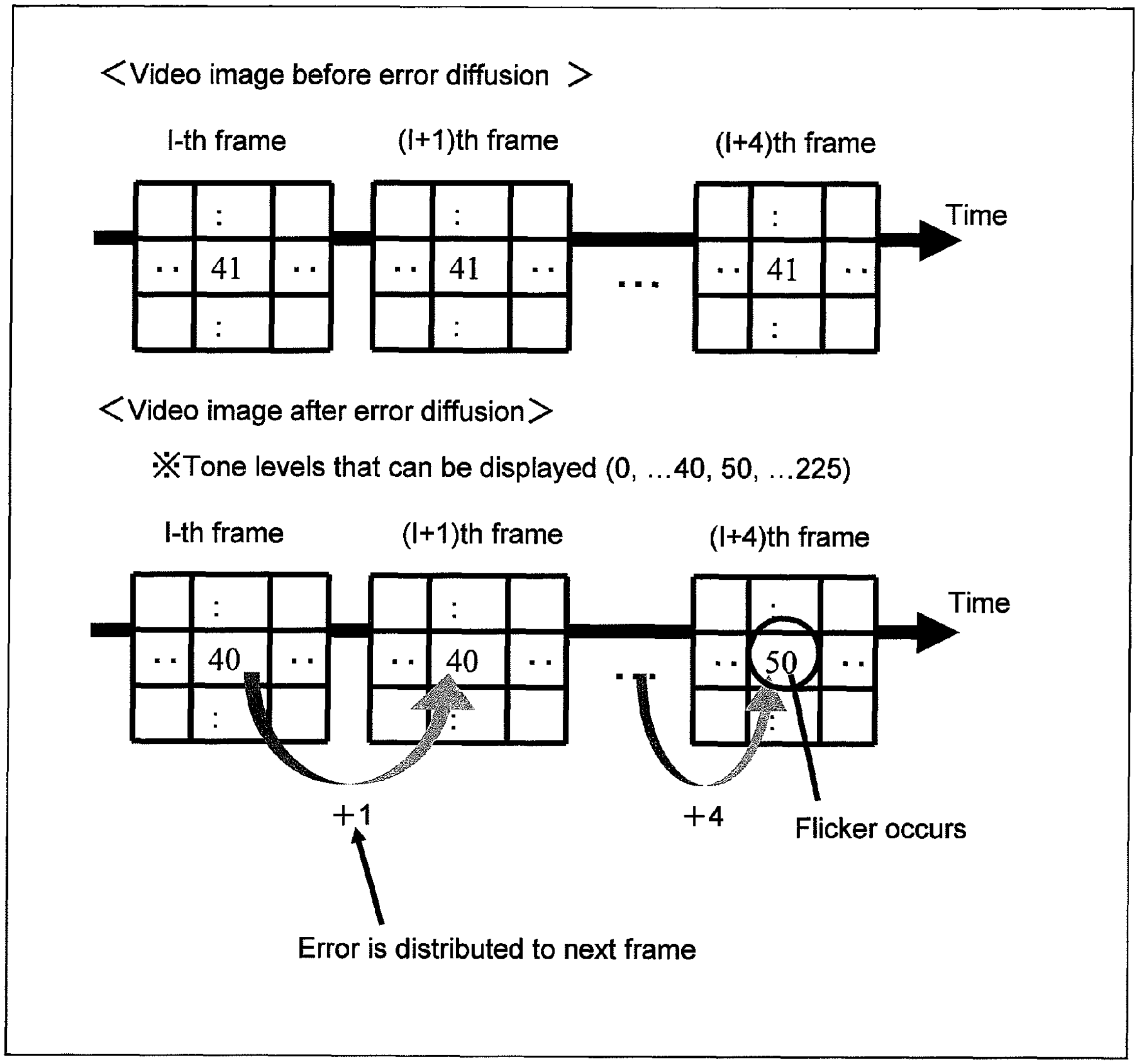
FIG. 2 is a diagram schematically describing flicker caused by error diffusion.

100, 200, 300 image processing device
101 variance calculation unit
102 dot storage unit
103 line storage unit
104, 1504 weight determination unit
105 error addition unit
106 tone level restriction unit
107 intra-frame error storage unit
108 inter-frame error storage unit
109 subtracter
110, 111 multiplier
113 error addition unit
1101 HPF value calculation unit
1104 weight determination unit
1401 frame storage unit
1404 weight determination unit
1406 tone level restriction unit
14071 dot error storage unit
14072 line error storage unit
1409 absolute value calculation unit
1509 average value calculation unit

BEST MODE FOR CARRYING OUT THE INVENTION

Embodiments of the present invention will now be described with reference to the drawings.

First Embodiment

1.1 Structure of the Image Processing Device

Figure 17:
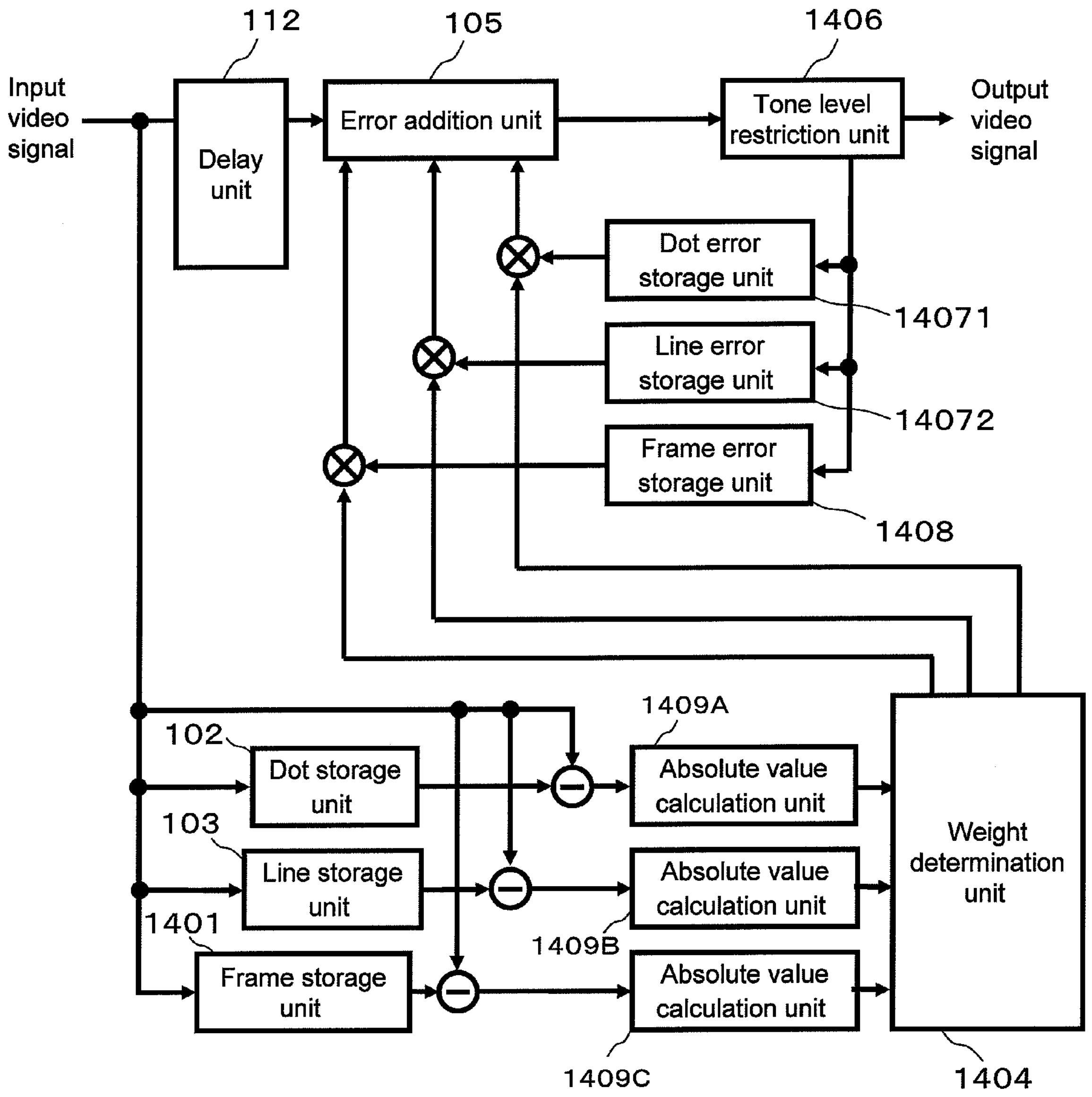
FIG. 17 is a block diagram showing conventional error diffusion that reduces flicker.

FIG. 1 is a block diagram of an image processing device 100 according to a first embodiment of the present invention. In FIG. 1, the components that are the same as the components shown in FIG. 17 are given the same reference numerals as those components.

The image processing device 100 receives a video signal that forms an image consisting of pixels (this video signal is referred to as an "input video signal"), processes the input video signal in units of pixels, and outputs the processed video signal (this video signal is hereafter referred to as an "output video signal").

The image processing device 100 includes a delay unit 112, an error addition unit 105, a tone level restriction unit 106, and a subtracter 109. The delay unit 112 receives target pixel data (hereafter simply referred to as a "target pixel") corresponding to an input video signal (the pixel value of a target pixel), and delays the input video signal to adjust its processing timing. The error addition unit 105 adds an error to the pixel value of the target pixel. The tone level restriction unit 106 restricts the tone levels of the video signal (corresponding to the target pixel) output from the error addition unit 105. The subtracter 109 subtracts the pixel value of the target pixel whose tone levels have been restricted from the pixel value of the target pixel whose tone levels have yet to be restricted. The image processing device 100 further includes a dot storage unit 102, a line storage unit 103, a variance calculation unit 101, and a weight determination unit 104. The dot storage unit 102 stores, in units of pixels, input video signals corresponding to a plurality of pixels. The line storage unit 103 stores, in units of lines, input video signals corresponding to a plurality of lines. The variance calculation unit 101 calculates a variance based on the pixel value of a target pixel and the pixel values of its neighboring pixels. The weight determination unit 104 determines an intra-frame error distribution rate and an inter-frame error distribution rate based on the variance calculated by the variance calculation unit 101, and determines a weight value used to weight each pixel. The image processing device 100 further includes a multiplier 110, a multiplier 111, an intra-frame error storage unit 107, and an inter-frame error storage unit 108. The multiplier 110 multiplies an output from the subtracter 109 by the intra-frame error distribution rate. The multiplier 111 multiplies an output from the subtracter 109 by the inter-frame error distribution rate. The intra-frame error storage unit 107 stores an output of the multiplier 110. The inter-frame error storage unit 108 stores an output of the multiplier 111.

The error addition unit 105, the multiplier 110, the multiplier 111, the intra-frame error storage unit 107, and the inter-frame error storage unit 108 are the main components of an error diffusion unit 113.

The delay unit 112 delays an input video signal, and outputs the delayed input video signal to the error addition unit 105. The delay unit 112 delays the input signal in a manner that the error addition unit 105 can add an error at an optimum timing to the target pixel, which is a pixel that is currently being processed in the image processing unit 100.

The error addition unit 105 receives the video signal (corresponding to the target pixel) output from the delay unit 112, and adds an error output from the intra-frame error storage unit 107 and an error output from the inter-frame error storage unit 108 to the pixel value of the target pixel. The error addition unit 105 then outputs the video signal (corresponding to the target pixel), to which the error values have been added, to the tone level restriction unit 106 and the subtracter 109.

The tone level restriction unit 106 receives the video signal output from the error addition unit 105, and restricts the tone levels of the video signal (corresponding to the target pixel) output from the error addition unit 105, and outputs, as an output video signal, the video signal whose tone levels have been restricted. The tone level restriction unit 106 also outputs the output video signal to the subtracter 109. The output video signal from the tone level restriction unit 106 is input into a display device (not shown), and an image (video image) formed using the output video signal is displayed on the display device.

When, for example, the input video signal is 8-bit data and the tone level restriction unit 106 restricts the tone levels of the video signal to generate 6-bit data, the tone level restriction unit 106 eliminates the lower two bits (=8−6) of the input video signal and outputs the remaining 6-bit data as an output video signal. More specifically, when, for example, the video signal input into the tone level restriction unit 106 is 8-bit data, that is, when, for example, the target pixel has a pixel value of 129 (10000001 in binary), the tone level restriction unit 106 eliminates the lower two bits (01 in binary) and outputs the remaining bit data as an output video signal.

The subtracter 109 expands the video signal (corresponding to the target pixel) output from the tone level restriction unit 106 to 8-bit data, and subtracts the 8-bit data from the video signal (corresponding to the target pixel) whose tone levels have yet to be restricted, which is output from the error addition unit 105, and outputs the resulting data to the multiplier 110 and the multiplier 111. More specifically, the subtracter 109 outputs an error generated through tone level restriction of the video signal performed by the tone level restriction unit 106. After the above processing performed by the tone level restriction unit 106, the subtracter 109 outputs, as an error, the lower 2-bit data (1 in decimal (=129−128) (01 in binary) in the above example) eliminated by the tone level restriction unit 106.

The dot storage unit 102 stores, in units of pixels, input video signals corresponding to a plurality of pixels. The dot storage unit 102 stores a plurality of neighboring pixels of a target pixel (or a plurality of neighboring pixels including a target pixel), and outputs the plurality of pixels (pixel values) to the variance calculation unit 101.

Figure 4:
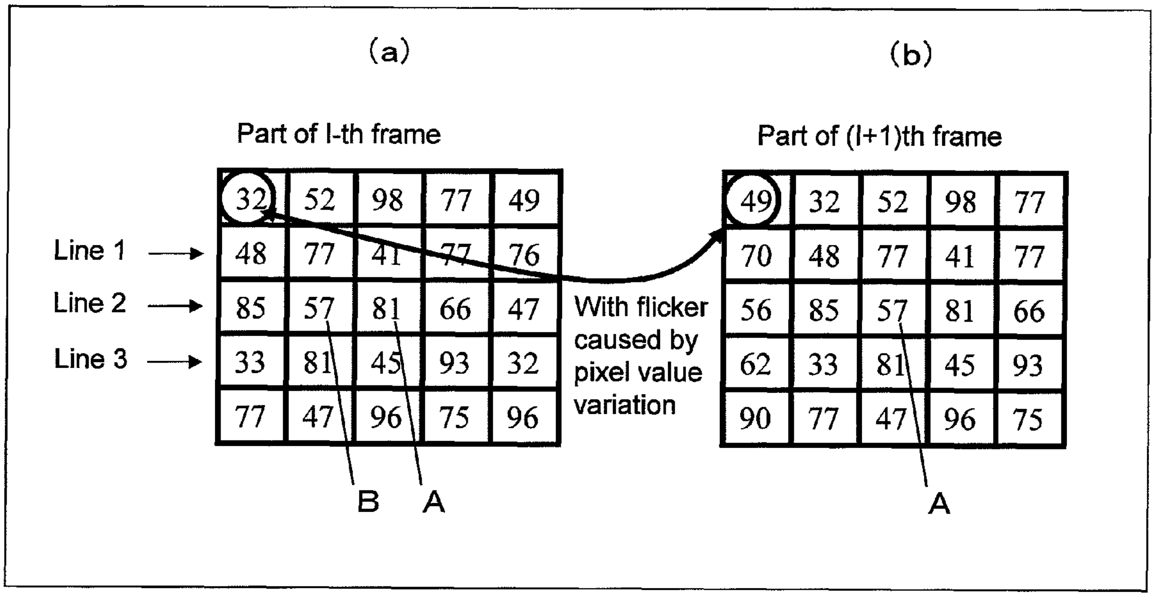
FIG. 4 shows the case with flicker caused by luminance value variation.

The processing described above will now be described in more detail with reference to FIG. 4(*a*). FIG. 4(*a*) shows the pixel values of pixels included in a predetermined area (area consisting of 5*5 pixels) that is formed using a video signal. For ease of explanation, a pixel indicated by letter A in the center of the area is assumed to be a target pixel (this pixel is hereafter referred to as "pixel A"), and a variance of an area consisting of 3*3 pixels including the target pixel at its center is assumed to be calculated (this setting is hereafter referred to as "setting 1").

In setting 1, the dot storage unit 102 stores the pixel value of a pixel at the lower left of the pixel A (pixel value of 81) and the pixel value of a pixel immediately below the pixel A (pixel value of 45). The dot storage unit 102 outputs the pixel values of these pixels (the pixel at the lower left of the pixel A and the pixel immediately below the pixel A) to the variance calculation unit 101.

The line storage unit 103 stores, in units of lines, input video signals corresponding to a plurality of lines. The line storage unit 103 stores a plurality of neighboring lines of the target pixel (the neighboring lines may include a line to which the target pixel belongs), and outputs the pixels (pixel values) of the plurality of lines to the variance calculation unit 101.

In setting 1, the line storage unit 103 stores the pixel values of pixels in lines 1 and 2 in FIG. 4(*a*). The line storage unit 103 outputs, among the pixels values stored in the line storage unit 103, the pixel value of a pixel at the upper left of the pixel A in line 1 (pixel value of 77), the pixel value of a pixel immediately above the pixel A in line 1 (pixel value of 41), and the pixel value of a pixel at the upper right of the pixel A in line 1 (pixel value of 77), and the pixel value of a pixel left to the pixel A in line 2 (pixel value of 57), the pixel value of the pixel A (pixel value of 81), and the pixel value of a pixel right to the pixel A in line 2 (pixel value of 66) to the variance calculation unit 101.

The variance calculation unit 101 receives the input video signal (the pixel value of the pixel corresponding to the input signal), the pixel values output from the dot storage unit 102, and the pixel values output from the line storage unit 103, and calculates a variance of the pixel values of the predetermined area including the target pixel at its center (area consisting of the target pixel and the neighboring pixels). The variance calculation unit 101 outputs the calculated variance to the weight determination unit 104.

In setting 1, the variance calculation unit 101 receives the input video signal corresponding to the pixel value of the pixel at the lower right of the pixel A (pixel value of 93). The variance calculation unit 101 also receives, from the line storage unit 103, the pixel value of the pixel at the upper left of the pixel A (pixel value of 77), the pixel value of the pixel immediately above the pixel A (pixel value of 41), the pixel value of the pixel at the upper right of the pixel A (pixel value of 77), the pixel value of the pixel left to the pixel A (pixel value of 57), the pixel value of the pixel A (pixel value of 81), and the pixel value of the pixel right to the pixel A (pixel value of 66). The variance calculation unit 101 further receives the pixel value of the pixel at the lower left of the pixel A (pixel value of 81) and the pixel value of the pixel immediately below the pixel A (pixel value of 45) from the dot storage unit 102. Using the nine input pixel values, the variance calculation unit 101 then calculates the variance of the area consisting of 3*3 pixels including the pixel A at its center.

The weight determination unit 104 determines a weight value based on the variance calculated by the variance calculation unit 101. The weight determination unit 104 determines an intra-frame error distribution rate and an inter-frame error distribution rate based on the variance. The intra-frame error distribution rate is the rate at which the error is distributed within the same frame. The inter-frame error distribution rate is the rate at which the error is distributed between different frames. The weight determination unit 104 then further determines a weight value used to weight each pixel. The weight determination unit 104 then outputs the weight values used in the error diffusion within the same frame to the multiplier 110, and outputs the weight values used in the error diffusion between different frames to the multiplier 111.

In setting 1, the rate at which the error is distributed within the same frame is assumed to be 7/16 for the pixel right to the target pixel A, 3/16 for the pixel at the lower left of the target pixel A, 5/16 for the pixel immediately below the target pixel A, and 1/16 for the pixel at the lower right of the target pixel A. The rate at which the error is distributed between different frames is assumed to be 1/16 for the pixel at the upper left of a target pixel A (pixel of a different frame at the same position as the pixel A of the current frame), 1/16 for the pixel immediately above the target pixel A, 1/16 for the pixel at the upper right of the target pixel A, 1/16 for the pixel left to the target pixel A, 8/16 for a pixel A (pixel of a different frame at the same position as the pixel A of the current frame), 1/16 for the pixel right to the pixel A, 1/16 for the pixel at the lower left of the pixel A, 1/16 for the pixel immediately below the pixel A, and 1/16 for the pixel at the lower right of the pixel A. The intra-frame error diffusion rate is determined to be $\alpha$ ($0 \leqq \alpha \leqq 1$) using the variance of the above area consisting of 3*3 pixels. The processing performed in this case will now be described.

In this case, the weight determination unit 104 outputs, to the multiplier 110, a weight value of $\alpha$*7/16 for the pixel right to the target pixel A, a weight value of $\alpha$*3/16 for the pixel at the lower left of the target pixel A, a weight value of $\alpha$*5/16 for the pixel immediately below the target pixel A, and a weight value of $\alpha$*1/16 for the pixel at the lower right of the target pixel A.

Also, the weight determination unit 104 outputs, to the multiplier 111, a weight value of $(1-\alpha)$*1/16 for the pixel at the upper left of the target pixel A (pixel of a different frame at the same position as the pixel A of the current frame), a weight value of $(1-\alpha)$*1/16 for the pixel immediately above the target pixel A, a weight value of $(1-\alpha)$*1/16 for the pixel at the upper right of the target pixel A, a weight value of $(1-\alpha)$*1/16 for the pixel left to the target pixel A, a weight value of $(1-\alpha)$*8/16 for the target pixel A (pixel of a different frame at the same position as the pixel A of the current frame), a weight value of $(1-\alpha)$*1/16 for the pixel right to the pixel A, a weight value of $(1-\alpha)$*1/16 for the pixel at the lower left of the pixel A, a weight value of $(1-\alpha)$*1/16 for the pixel immediately below the pixel A, and a weight value of $(1-\alpha)$*1/16 for the pixel at the lower right of the pixel A.

The multiplier 110 multiplies an error of a video signal generated through tone level restriction, which is output from the subtracter 109, by a weight value for each pixel, which is output from the weight determination unit. The multiplier 110 then outputs the result of the multiplication performed for each pixel to the intra-frame error storage unit 107.

In setting 1, the multiplier 110 multiplies an error of a video signal generated through tone level restriction by a weight value calculated for each of the pixel right to the target pixel A, the pixel at the lower left of the target pixel A, the pixel immediately below the target pixel A, and the pixel at the lower right of the target pixel A, and outputs the result of the multiplication performed for each pixel to the intra-frame error storage unit 107.

The multiplier 111 multiplies an error of a video signal generated through tone level restriction, which is output from the subtracter 109, by a weight value for each pixel, which is calculated by the weight determination unit. The multiplier 111 then outputs the result of the multiplication performed for each pixel to the inter-frame error storage unit 108.

In setting 1, the multiplier 111 multiplies an error of a video signal generated through tone level restriction by a weight value calculated for each of the pixel of a different frame at the same position as the target pixel A of the current frame, the pixel at the lower left of the target pixel A (pixel of a different frame at the same position as the target pixel A), the pixel immediately above the target pixel A, the pixel at the upper right of the target pixel A, the pixel left to the target pixel A, the pixel right to the target pixel A, the pixel at the lower left of the target pixel A, the pixel immediately below the target pixel A, and the pixel at the lower right of the target pixel A, and outputs the result of the multiplication performed for each of the nine pixels to the inter-frame error storage unit 108.

The intra-frame error storage unit 107 stores information about the position of each pixel. The intra-frame error storage unit 107 further stores the result of the multiplication performed for each pixel in the multiplier 110 as error data to be added to each pixel. The intra-frame error storage unit 107 outputs, for a pixel to which an error is to be added, error data associated with the pixel to which an error is to be added to the error addition unit 105 at the timing when a video signal corresponding to pixel data of the pixel to which an error is to be added is input into the error addition unit 105. The intra-frame error storage unit 107 updates the error data associated with each pixel every time when the multiplication result data of each pixel is input from the multiplier 110 (updates the multiplication result data of each pixel at the same position every time when the multiplication result data is input from the multiplier 110 by adding or subtracting the input multiplication result data to or from the error data associated with each pixel).

The inter-frame error storage unit 108 stores information about the position of each pixel. The inter-frame error storage unit 108 further stores the result of the multiplication performed for each pixel in the multiplier 111 as error data to be added to each pixel. The inter-frame error storage unit 108 outputs, for a pixel to which an error is to be added, error data associated with the pixel to which an error is to be added to the error addition unit 105 at the timing when a video signal corresponding to pixel data of the pixel to which an error is to be added is input into the error addition unit 105. The inter-frame error storage unit 108 updates the error data associated with each pixel every time when the multiplication result data of each pixel is input from the multiplier 111 (updates the multiplication result data of each pixel at the same position every time when the multiplication result data is input from the multiplier 111 by adding or subtracting the input multiplication result data to or from the error data associated with each pixel).

1.2 Intra-Frame and Inter-Frame Error Distribution

Intra-frame error distribution and inter-frame error distribution will now be described.

Figure 3:
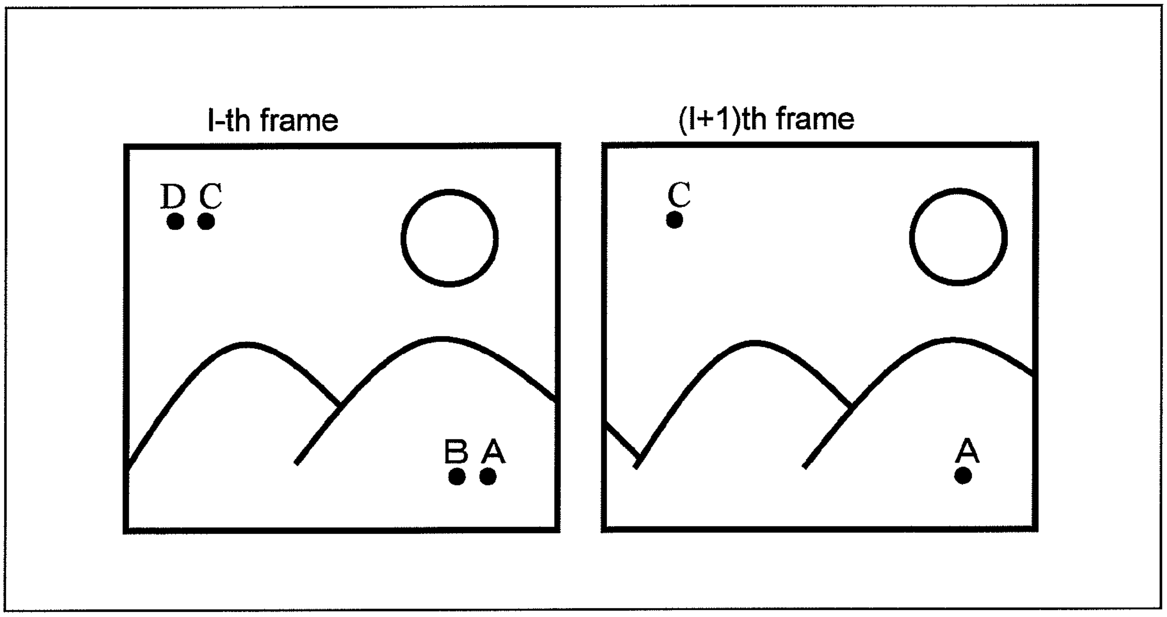
FIG. 3 shows the composition difference between two frames.

An I-th frame (I is a natural number) and an (I+1)th frame of a moving image rarely coincide with each other completely, and often have different compositions as shown in FIG. 3. In this case, a pixel at the position A of the (I+1)th frame is the same as a pixel at the position B of the I-th frame, which is a neighboring pixel of a pixel at the position A of the I-th frame. More specifically, the pixel value of a target pixel changes in a temporal direction (the direction of frames) by an amount corresponding to a difference between the pixel value of the target pixel and the pixel value of its neighboring pixel. Thus, when a plurality of consecutive frames each include an area consisting of pixels with large pixel values variations, the pixel values of pixels change in the temporal direction in the manner shown in FIG. 4. Such pixel value change causes flicker to occur even before error diffusion is performed.

Figure 5:
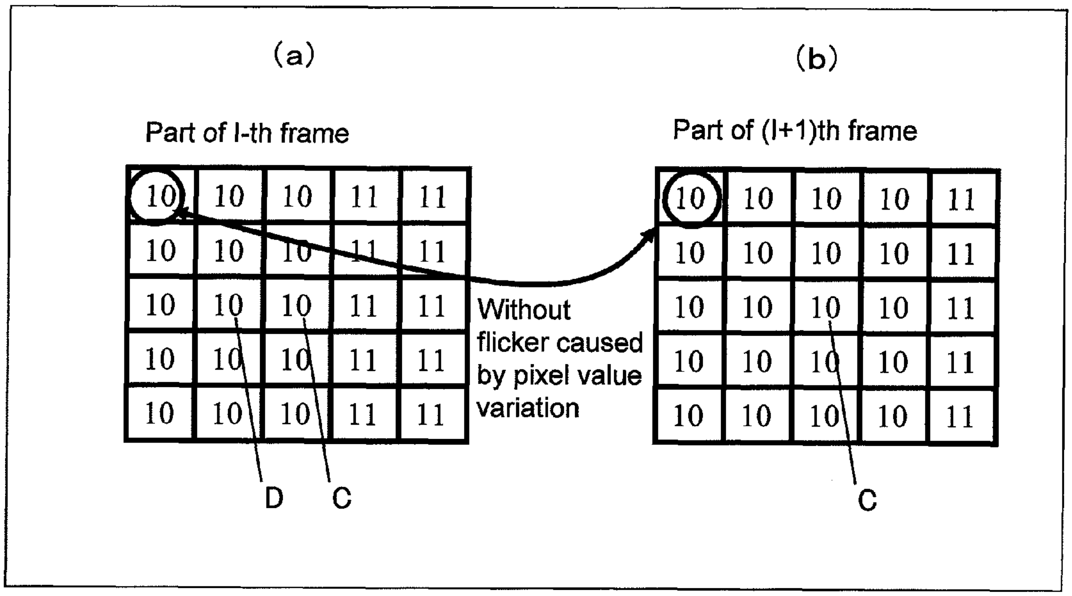
FIG. 5 shows the case without flicker caused by luminance value variation.

When a plurality of consecutive frames each include an area consisting of pixels with small pixel value variations, the pixel values of pixels mostly do not change in the temporal direction as shown in FIG. 5. No such pixel value change causes almost no flicker to occur. For the reasons described above, flicker, which may be generated through error distribution to different frames, tends to be less noticeable when a plurality of consecutive frames each include an area consisting of pixels with large pixel value variations and is more noticeable when a plurality of consecutive frames each include an area consisting of pixels with small pixel value variations.

Also, the pixel value of a target pixel of the (I+1)th frame often coincides with the pixel value of a neighboring pixel of a pixel of the I-th frame at the same position as the target pixel of the (I+1)th frame. Thus, as shown in FIGS. 4 and 5, the two frames share a certain area with the same degree of pixel value variation. This indicates that the degree of pixel value variation calculated using an area consisting of a target pixel of the (I+1)th frame and its neighboring pixels correlates highly with the degree of pixel value variation calculated using an area consisting of a pixel at the same position as the target pixel of the I-th frame and neighboring pixels of the pixel at the same position. Thus, the degree of pixel value variation across an area of the next frame can be estimated based on a value calculated using the degree of pixel value variation based on the pixel values of a predetermined area consisting of the target pixel and its neighboring pixels.

This structure therefore enables a flicker-noticeable area (an area consisting of pixels with small pixel value variations included in a plurality of consecutive frames) to be estimated by calculating the degree of pixel value variation across an area consisting of a target pixel of the I-th frame and its neighboring pixels and estimating the degree of pixel value variation of the (I+1)th frame based on the calculated degree of pixel value variation of the I-th frame. The image processing device with this structure can distribute an error generated in the I-th frame in an optimum manner according to the relationship between the pixel values of the I-th frame and the pixel values of the (I+1)th frame, while requiring smaller memory and involving shorter delay time.

1.3 Operation of the Image Processing Device

The operation of the image processing device 100 with the above-described structure will now be described.

First, the dot storage unit 102 and the line storage unit 103 of the present embodiment will be described.

The dot storage unit 102 and the line storage unit 103 receive an input video signal, and store pixels that will be used by the variance calculation unit 101 to calculate a variance, and output the pixels.

The variance calculation unit 101 of the present embodiment will now be described.

Figure 6:
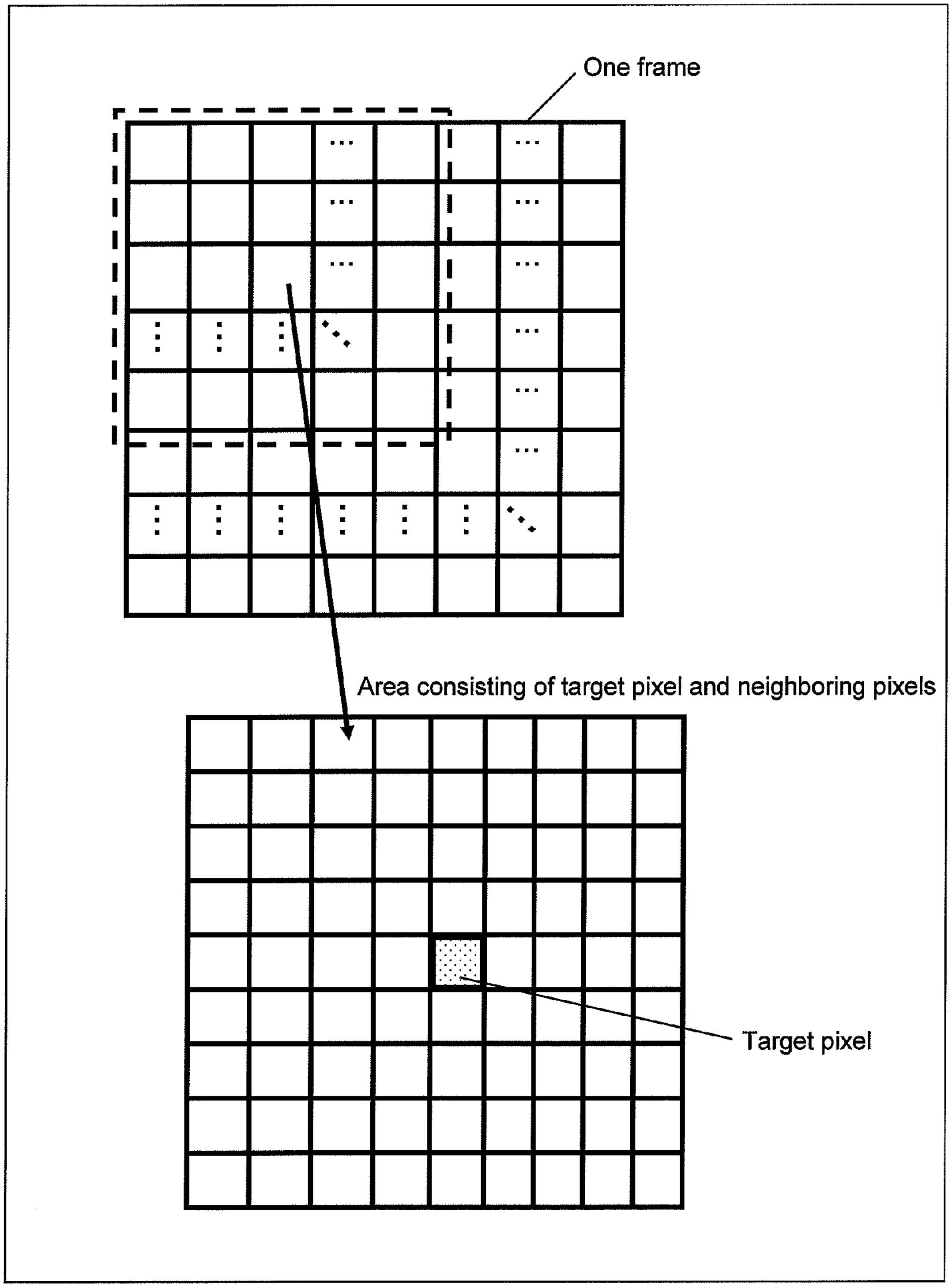
FIG. 6 shows an area consisting of a target pixel and its neighboring pixels.

The variance calculation unit 101 calculates a variance of a single block consisting of a target pixel and its neighboring pixels. For example, the variance calculation unit 101 calculates a variance of a block consisting of 9*9 pixels including a target pixel at the center of the block as shown in FIG. 6 After calculating the variance of the single block, the variance calculation unit 101 calculates a variance of a next block consisting of a new target pixel, which is adjacent to the previous target pixel, and neighboring pixels of the new target pixel. After processing a single line of pixels by setting each pixel as a new target pixel in this manner, the variance calculation unit 101 then moves to a next line, and calculates a variance of each block of pixels in the same manner as described above.

The weight determination unit 104 of the present embodiment will now be described.

Figure 7:
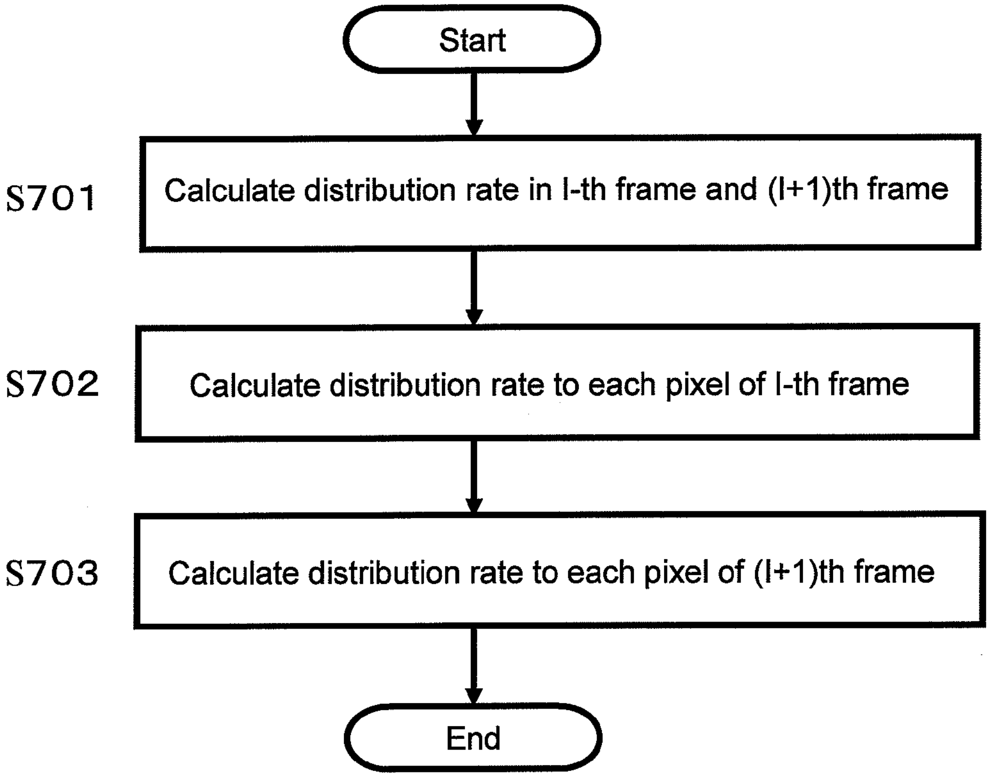
FIG. 7 is a flowchart illustrating the processing performed by a weight determination unit.

FIG. 7 is a flowchart illustrating the processing performed by the weight determination unit 104.

In step S701, the weight determination unit 104 calculates the rate (intra-frame error distribution rate) at which an error is distributed to the I-th frame (I is a natural number) and the rate (inter-frame error distribution rate) at which an error is distributed to the (I+1)th frame based on the variance.

Figure 8:
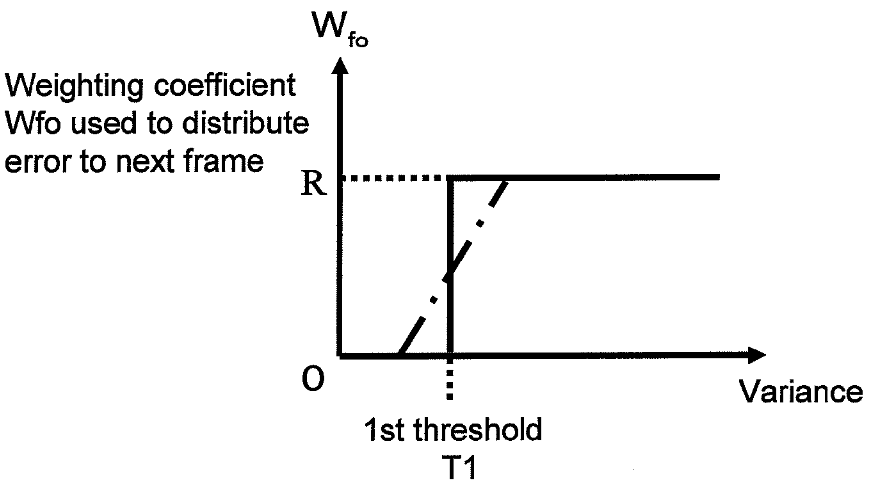
FIG. 8 shows a function used to determine the rate at which an error is distributed to a different frame using a variance.

FIG. 8 shows one example of a function used to calculate the inter-frame error distribution rate. This function is written as formula 1 below. The inter-frame error distribution rate is calculated using this function as 0 for an area in consisting of pixels with small pixel value variations, and as a value equal to or smaller than 1 and greater than 0 for an area consisting of pixels with large pixel value variations.

In this manner, an inter-frame error distribution rate Wfo and an intra-frame error distribution rate Wfi are calculated based on a variance V using formula 1 below.

Formula 1

$$W_{fo} = \begin{cases} 0 \ \ldots \ (V < T1) \\ R \ \ldots \ (T1 \leq V) \end{cases}$$

$$W_{fi} = 1 - W_{fo}$$

$$(0 < R \leq 1)$$

The function used to calculate the inter-frame error distribution rate may alternatively have the characteristic indicated using an alternate long and short dash line in FIG. 8.

Next, the weight determination unit 104 calculates the error distribution rate to each pixel of the I-th frame based on the intra-frame error distribution rate Wfi calculated in step S701 (step S702).

Figure 9:
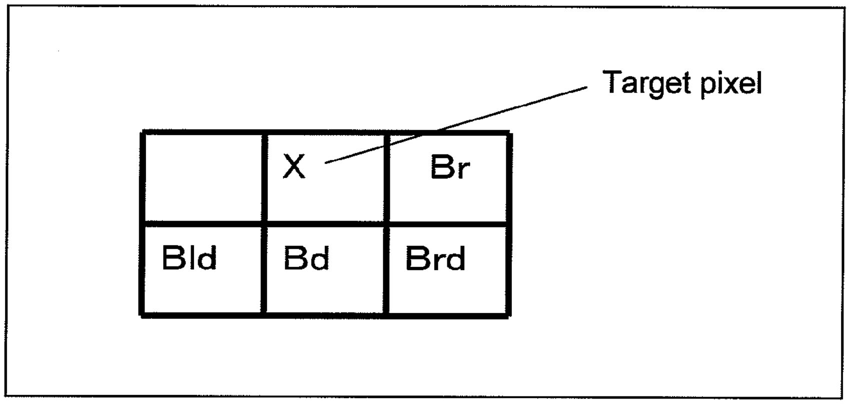
FIG. 9 shows error distribution to pixels within the same frame.

For example, the weight determination unit 104 distributes the error to four adjacent pixels as shown in FIG. 9. In the figure, X indicates a target pixel, and Br, Bld, Bd, and Brd indicate the error distribution rates of the four pixels. The rate calculated by multiplying the intra-frame error distribution rate Wfi by each error distribution rate (Br, Bld, Bd, and Brd) is used as the error distribution rate to each of the four pixels of the I-th frame. The values of the error distribution rates Br, Bld, Bd, and Brd may be, for example, 7/16, 3/16, 5/16, and 1/16, respectively.

The weight determination unit 104 finally calculates the error distribution rate to each pixel of the (I+1)th frame based on the inter-frame error distribution rate Wfo calculated in step S701 (step S703).

Figure 10:
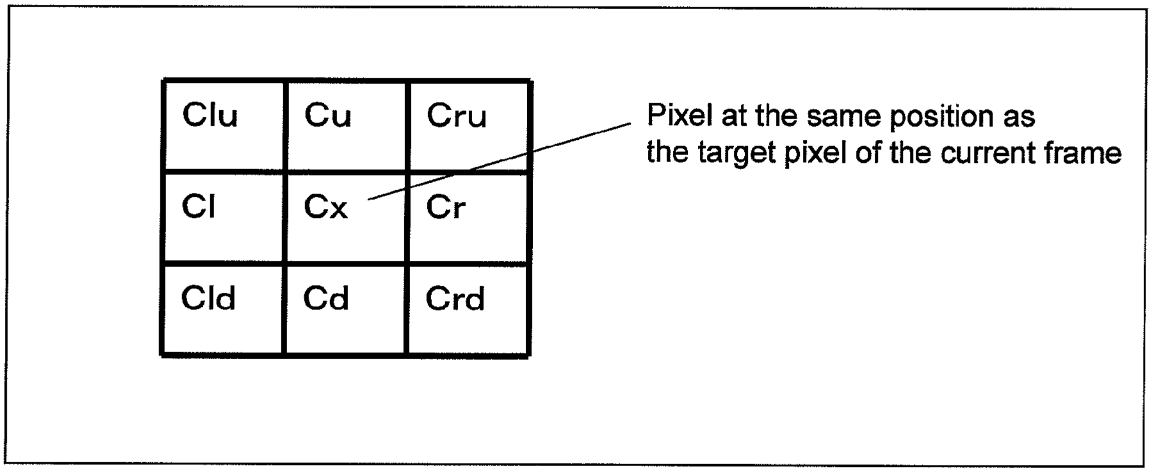
FIG. 10 shows error distribution to pixels of a next frame.

As one example, the error is assumed to be distributed to the 3*3 pixels of the (I+1)th frame as shown in FIG. 10. In the figure, Clu, Cu, Cru, Cl, Cx, Cr, Cld, Cd, and Crd indicate the error distribution rates of the nine pixels. The pixel with the error distribution rate Cx is at the same position as the target pixel of the I-th frame. The rate calculated by multiplying the inter-frame error distribution rate Wfo by each error distribution rate (Clu, Cu, Cru, Cl, Cx, Cr, Cld, Cd, and Crd) is used as the error distribution rate to each of the nine pixels of the (I+1)th frame. The values of the error distribution rates Clu, Cu, Cru, Cl, Cx, Cr, Cld, Cd, and Crd may be, for example, 1/16, 1/16, 1/16, 1/16, 8/16, 1/16, 1/16, 1/16, and 1/16, respectively.

The weight determination unit 104 operates in the manner described above.

The error addition unit 105 of the present embodiment will now be described.

The error addition unit 105 adds an error generated in the (I−1)th frame, which is output from the inter-frame error storage unit 108, to the input video signal. The error addition unit 105 further adds an error generated in the I-th frame, which is output from the intra-frame error storage unit 107, to the signal to which the error has been added, and outputs the resulting value.

The tone level restriction unit 106 of the present embodiment will now be described.

The tone level restriction unit 106 receives the value of the input signal to which the error values have been added by the error addition unit 105. The tone level restriction unit 106 prestores information about the tone level values that can be output as an output signal. The tone level restriction unit 106 compares the input signal value with the information about the tone level values that can be output, and uses, as an output value, a value of the input signal closest to the tone level values that can be output.

The intra-frame error storage unit 107 of the present embodiment will now be described.

The intra-frame error storage unit 107 receives the value calculated by subtracting the input value of the tone level restriction unit 106 from the output value of the tone level restriction unit 106, which is output from the subtracter 109, by the distribution rate calculated for each of the unprocessed pixels of the I-th frame by the weight determination unit 104 (corresponding to the pixel right to the target pixel, the pixel at the lower left of the target pixel, the pixel immediately below the target pixel, and the pixel at the lower right of the target pixel in setting 1). Among the error values (error data) stored in the intra-frame error storage unit 107, an error value (error data) corresponding to an input video signal (pixel value corresponding to the target pixel) is output from the intra-frame error storage unit 107 to the error addition unit 105. The error addition unit 105 then adds the error data output from the intra-frame error storage unit 107 to the pixel value of the target pixel.

The inter-frame error storage unit 108 receives the value calculated by multiplying the difference between the input value of the tone level restriction unit 106 and the output value of the tone level restriction unit 106 by the distribution rate calculated for the pixels of the (I+1)th frame by the weight determination unit 104, which is output from the subtracter 109. Among the error values (error data) stored in the inter-frame error storage unit 108, the error value (error data) corresponding to an input video signal (pixel value corresponding to the target pixel) is output from the inter-frame error storage unit 108 to the error addition unit 105. When, for example, the pixel value of the target pixel of the I-th frame is to be processed by the error addition unit 105, the error addition unit 105 adds the error data calculated based on a video signal of a frame preceding the (I−1)th frame and stored in the inter-frame error storage unit 108 (the error data used to distribute an error between frames) to the pixel value of the target pixel. The error addition unit 105 further adds the error data of the I-th frame stored in the intra-frame error storage unit 107 (the error data used to distribute an error within the same frame) to the pixel value of the target pixel. More specifically, the error addition unit 105 adds the error data used to distribute an error within the same frame and the error data used to distribute an error between different frames to the pixel value of the target pixel (pixel that is currently being processed), and outputs the pixel value to which the error data of the intra-frame error distribution and the error data of the inter-frame error distribution have been added (corresponding to the video signal output from the error addition unit 105) to the tone level restriction unit 106.

The image processing device 100 of the first embodiment changes the error distribution rate according to a value calculated using the degree of pixel value variation across an area consisting of a target pixel of the I-th frame (current frame) and its neighboring pixels in a manner to prevent flicker in an image displayed by a display device using a video signal. To reduce flicker, the image processing device 100 distributes (diffuses) no error to frames different from the current frame (other frames) in a flicker-noticeable area of an image displayed by the display device using a video signal. The image processing device 100 distributes (diffuses) an error to different frames in other areas (areas in which flicker would be less noticeable), and improves the reproducibility of tone levels of the video signal.

The image processing device 100 uses a variance as a value indicating the degree of pixel value variation. Using the variance, the image processing device 100 obtains information about the degree of pixel value variation across the entire area consisting of a target pixel of the I-th frame and its neighboring pixels. This enables the image processing device 100 to estimate the degree of pixel value variation of the (I+1)th frame based on the degree of pixel value variation of the I-th frame. The image processing device 100 therefore does not need to store information about frames other than the current frame to determine the intra-frame error distribution rate and the inter-frame error distribution rate, and requires smaller memory and involves shorter delay time.

Second Embodiment

An image processing device 200 according to a second embodiment of the present invention will now be described with reference to the drawings.

2.1 Structure of the Image Processing Device

Figure 11:
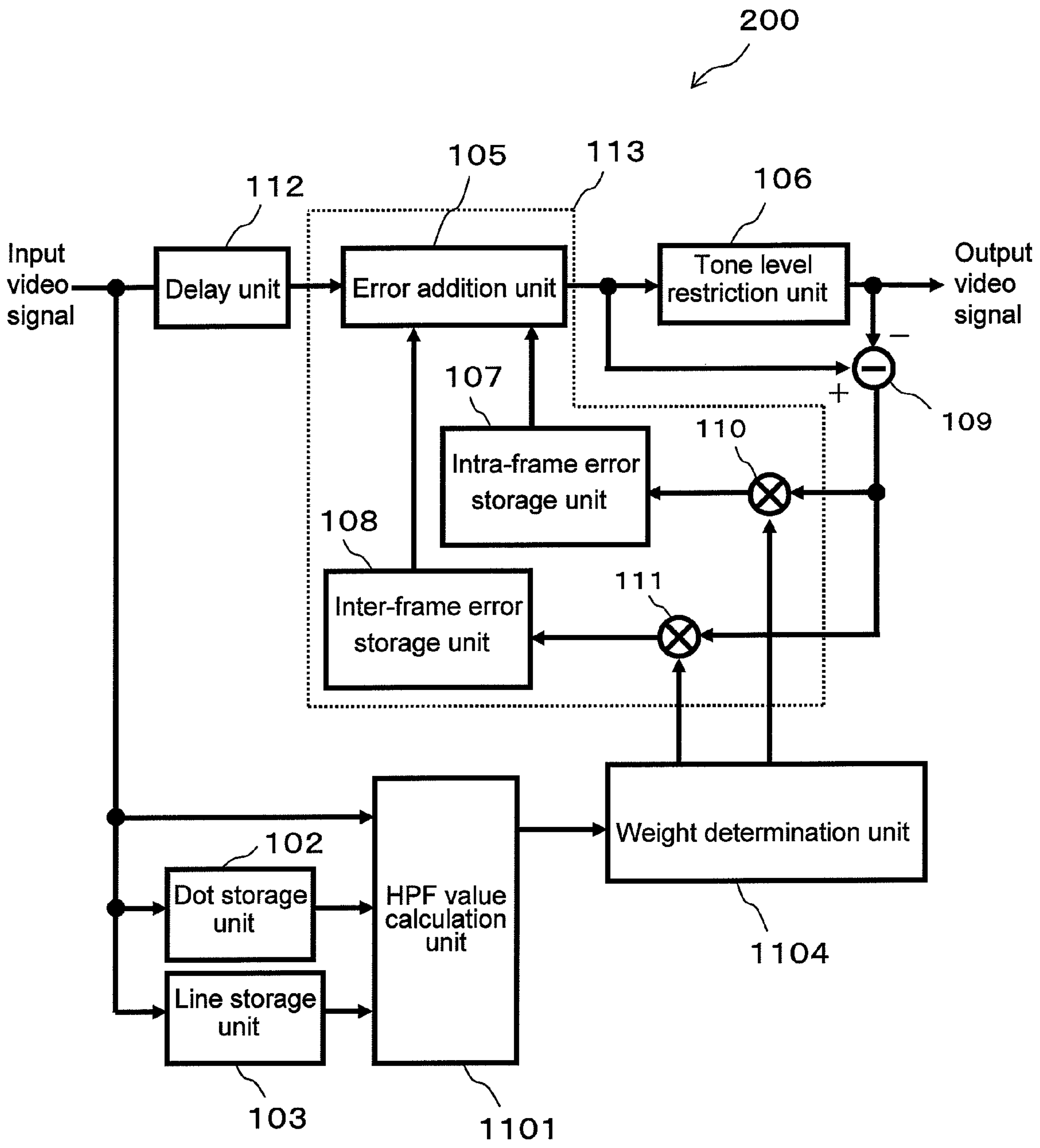
FIG. 11 is a block diagram of an image processing device according to a second embodiment of the present invention.

FIG. 11 is a block diagram of the image processing device 200 according to the second embodiment of the present invention. The components of the image processing device 200 of the second embodiment that are the same as the components of the image processing device 100 of the first embodiment are given the same reference numerals as those components and will not be described in detail.

The image processing device 200 includes a delay unit 112, an error addition unit 105, a tone level restriction unit 106, and a subtracter 109. The delay unit 112 receives the pixel value of a target pixel corresponding to an input video signal, and delays the input video signal to adjust its processing timing. The error addition unit 105 adds an error to the pixel value of the target pixel. The tone level restriction unit 106 restricts the tone levels of the video signal (corresponding to the target pixel) output from the error addition unit 105. The subtracter 109 subtracts the pixel value of the target pixel whose tone levels have been restricted from the pixel value of the target pixel whose tone levels have yet to be restricted. The image processing device 200 further includes a dot storage unit 102, a line storage unit 103, a HPF value calculation unit 1101, and a weight determination unit 1104. The dot storage unit 102 stores, in units of pixels, input video signals corresponding to a plurality of pixels. The line storage unit 103 stores, in units of lines, input video signals corresponding to a plurality of lines. The HPF value calculation unit 1101 calculates a HPF value, which indicates a high-frequency element, by processing an area consisting of the pixel value of a target pixel and the pixel values of its neighboring pixels through a high pass filter (HPF). The weight determination unit 1104 determines an intra-frame error distribution rate and an inter-frame error distribution rate based on the HPF value calculated by the HPF value calculation unit 1101, and also determines a weight value used to weight each pixel. The image processing device 200 further includes a multiplier 110, a multiplier 111, an intra-frame error storage unit 107, and an inter-frame error storage unit 108. The multiplier 110 multiplies an output from the subtracter 109 by the intra-frame error distribution rate. The multiplier 111 multiplies an output from the subtracter 109 by the inter-frame error distribution rate. The intra-frame error storage unit 107 stores an output of the multiplier 110. The inter-frame error storage unit 108 stores an output of the multiplier 111.

The HPF value calculation unit 1101 receives an input video signal (the pixel value of a pixel corresponding to an input signal), a pixel value output from the dot storage unit 102, and a pixel value output from the line storage unit 103, and processes a predetermined area including a target pixel at its center (area consisting of a target pixel and its neighboring pixels) through a high pass filter (HPF) to extract a high-frequency element of the predetermined area. In other words, the HPF value calculation unit 1101 calculates a HPF value. The HPF value calculation unit 1101 outputs the calculated HPF value to the weight determination unit 1104.

The weight determination unit 1104 receives the HPF value output from the HPF value calculation unit, and outputs a weight value used to weight each pixel, which is determined based on the rate (intra-frame error distribution rate) at which an error generated trough tone level restriction of the video signal is distributed to unprocessed pixels of the I-th frame (a pixel right to the target pixel, a pixel at the lower left of the target pixel, a pixel immediately below the target pixel, and a pixel at the lower right of the target pixel in setting 1), to the multiplier 110. The weight determination unit 1104 also outputs a weight value used to weight each pixel, which is determined by the rate (inter-frame error distribution rate) at which an error is distributed to pixels of the (I+1)th frame (a target pixel, a pixel at the upper left of the target pixel, a pixel immediately above the target pixel, a pixel at the upper right of the target pixel, a pixel left to the target pixel, a pixel right to the target pixel, a pixel at the lower left of the target pixel, and a pixel at the lower right of the target pixel in setting 1), to the multiplier 111.

2.2 Operation of the Image Processing Device

The operation of the image processing device 200 of the present embodiment that is the same as the operation of the image processing device 100 of the first embodiment will not be described in detail. The image processing device 200 of the present embodiment differs from the image processing device 100 of the first embodiment in the HPF value calculation unit 1101 and the weight determination unit 1104.

The HPF value calculation unit 1101 included in the image processing device 200 of the present embodiment will now be described.

Figures 12, 13:
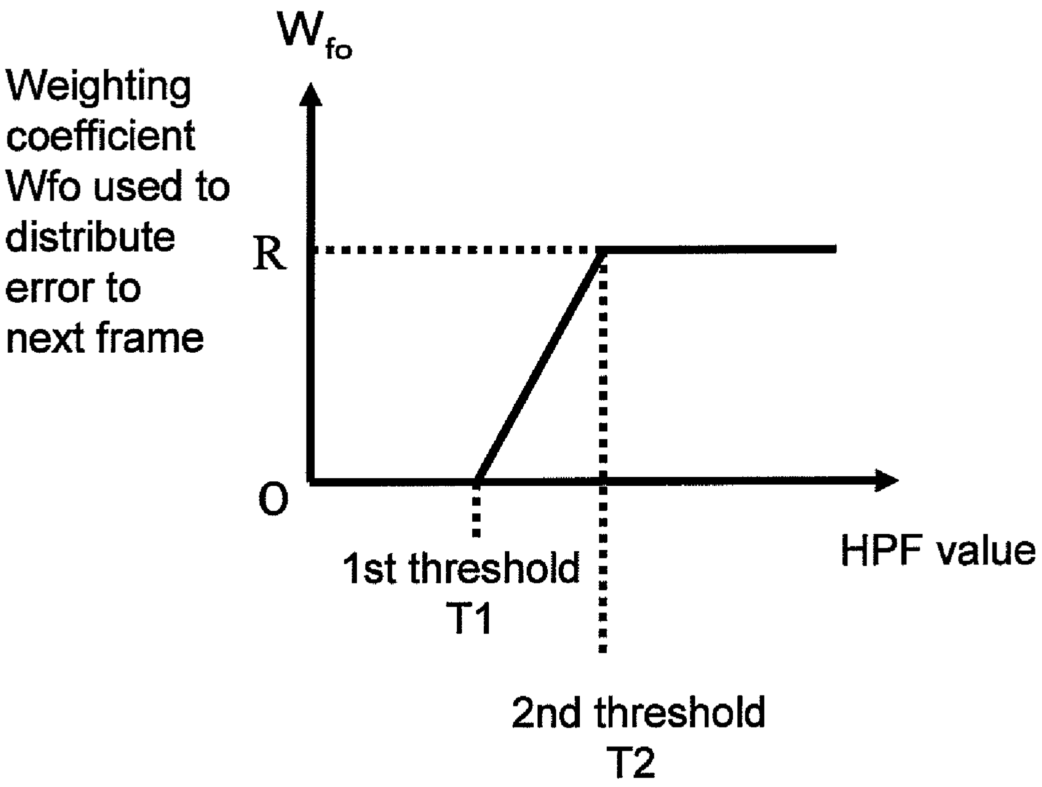
FIG. 12 shows a HPF.
FIG. 13 shows a function used to determine the rate at which an error is distributed to a different frame using a HPF value.

The HPF value calculation unit 1101 calculates the value of a HPF (HPF value) of a single block consisting of a target pixel and its neighboring pixels. For example, the HPF value calculation unit 1101 processes a block consisting of 3*3 pixels including a target pixel at its center through a HPF as shown in FIG. 12. After calculating the HPF value of the single block, the HPF value calculation unit 1101 calculates a HPF value of a next block consisting of a new target pixel, which is adjacent to the previous target pixel, and neighboring pixels of the new target pixel. After processing a single line of pixels by setting each pixel as a new target pixel in this manner, the HPF value calculation unit 1101 then moves to a next line, and calculates a HPF value of each block of pixels in the same manner as described above.

The weight determination unit 1104 included in the image processing device 200 of the present embodiment will now be described.

FIG. 7 is a flowchart illustrating the processing performed by the weight determination unit 1104.

The processing in steps S702 and S703 performed by the weight determination unit 1104 included in the image processing device 200 is the same as the processing in steps S702 and S703 performed by the weight determination unit 104 of the first embodiment and will not be described in detail. Only the processing in step S701 will be described.

In the same manner as in the first embodiment, the weight determination unit 1104 calculates the intra-frame error distribution rate and the inter-frame error distribution rate in step S701 of the present embodiment. The processing in step S701 of the present embodiment differs from the processing in the first embodiment in that the weight determination unit 1104 uses the HPF value as the value calculated using the degree of pixel value variation of the I-th frame, although the weight determination unit in the first embodiment uses the variance as the value calculated using the degree of pixel value variation of the I-th frame.

FIG. 13 shows one example of a function used to calculate the inter-frame error distribution rate. This function is written as formula 2 below. The inter-frame error distribution rate is calculated using this function as 0 for an area with the degree of pixel value variation equal to or smaller than a first threshold, as a value R (R≠0) in an area with the degree of pixel value variation greater than a second threshold, and as a value smaller as the degree of pixel value variation is closer to the first threshold in an area with the degree of pixel value variation between the first threshold and a second threshold. An inter-frame error distribution rate Wfo and an intra-frame error distribution rate Wfi of the I-th frame are calculated based on a HPF value F using formula 2 below (step S701).

Formula 2

$$W_{fo} = \begin{cases} 0 \ \ldots \ (0 < F \le T1) \\ R \cdot (F - T1)/(T2 - T1) \ \ldots \ (T1 < F \le T2) \\ R \ \ldots \ (T2 < F) \end{cases}$$

$$W_{fi} = 1 - W_{fo}$$

$$(0 < R \le 1)$$

The image processing device 200 of the present embodiment changes the error distribution rate according to a value calculated using the degree of pixel value variation across an area consisting of a target pixel of the I-th frame (current frame) and its neighboring pixels in a manner to prevent flicker in an image displayed by a display device using a video signal. The image processing device 200 sets the first threshold and the second threshold for the HPF value in the manner shown in FIG. 13, and distributes the error at a rate suitable for each area. As a result, the image processing device 200 reduces flicker while improving the reproducibility of tone levels of a video signal.

The image processing device 200 uses a high-frequency element as a value indicating the degree of pixel value variation. Using the high-frequency element, the image processing device 200 obtains information about the degree of pixel value variation across the entire area consisting of a target pixel of the I-th frame and its neighboring pixels. This enables the image processing device 200 to estimate the degree of pixel value variation of the (I+1)th frame based on the degree of pixel value variation of the I-th frame. The image processing device 200 therefore does not need to store information about frames other than the current frame to determine the intra-frame error distribution rate and the inter-frame error distribution rate, and requires smaller memory and involves shorter delay time.

Although each of the weight determination units 104 and 1104 calculates the error distribution rate using the function in the first and second embodiments, the present invention should not be limited to this structure. For example, the weight determination units 104 and 1104 may determine the error distribution rate by selecting, based on a value calculated using the degree of pixel value variation, an optimum rate from a lookup table (LUT) prestoring a plurality of error distribution rates.

Although the variance calculation unit 101, which is a functional block for obtaining information about the degree of pixel value variation, calculates a variance using a filter having a size of 9*9 pixels and the HPF value calculation unit, which is a functional block for obtaining information about the degree of pixel value variation, calculates a HPF value using a filter having a size of 3*3 pixels, the filter size should not be limited to such particular sizes. The image processing device will process a video image including motion more appropriately as the filter size is larger, whereas the image processing device will have a smaller processing load as the filter size is smaller.

Third Embodiment

An image processing device 300 according to a third embodiment of the present invention will now be described with reference to the drawings.

3.1 Structure of the Image Processing Device

Figure 14:
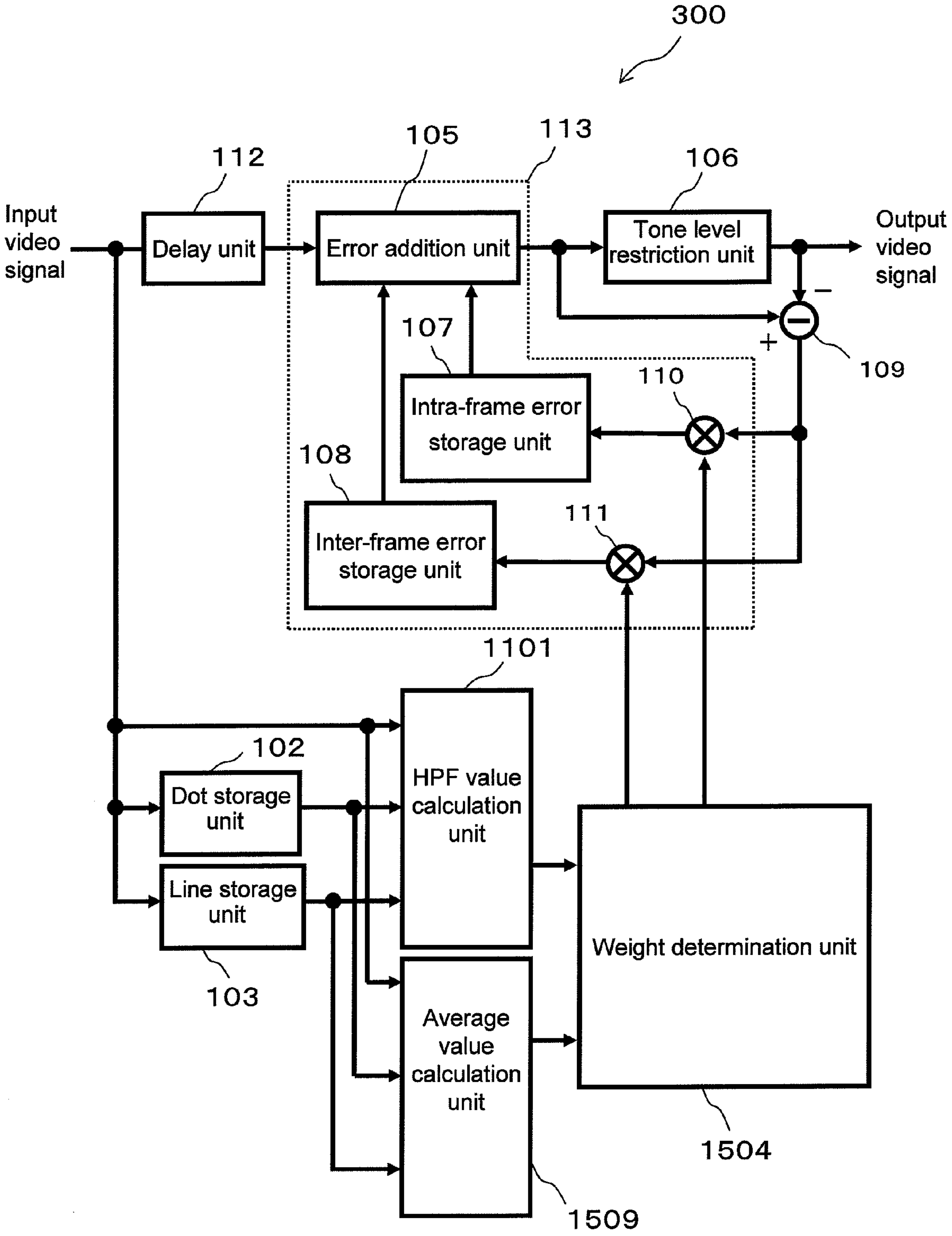
FIG. 14 is a block diagram of an image processing device according to a third embodiment of the present invention.

FIG. 14 is a block diagram of the image processing device 300 according to the third embodiment of the present invention. The components of the image processing device 300 of the third embodiment that are the same as the components of the image processing devices 100 and 200 of the above embodiments are given the same reference numerals as those components and will not be described in detail.

The image processing device 300 includes a delay unit 112, an error addition unit 105, a tone level restriction unit 106, and a subtracter 109. The delay unit 112 receives the pixel value of a target pixel corresponding to an input video signal, and delays the input video signal to adjust its processing timing. The error addition unit 105 adds an error to the pixel value of the target pixel. The tone level restriction unit 106 restricts the tone levels of the video signal (corresponding to the target pixel) output from the error addition unit 105. The subtracter 109 subtracts the pixel value of the target pixel whose tone levels have been restricted from the pixel value of the target pixel whose tone levels have yet to be restricted. The image processing device 300 further includes a dot storage unit 102, a line storage unit 103, a HPF value calculation unit 1101, an average value calculation unit 1509, and a weight determination unit 1504. The dot storage unit 102 stores, in units of pixels, input video signals corresponding to a plurality of pixels. The line storage unit 103 stores, in units of lines, input video signals corresponding to a plurality of lines. The HPF value calculation unit 1101 calculates a HPF value, which is a high-frequency element, by processing an area consisting of the pixel value of a target pixel and the pixel values of its neighboring pixels through a HPF. The average value calculation unit 1509 calculates an average of pixel values of an area consisting of the pixel value of the target value and the pixel values of its neighboring pixels. The weight determination unit 1504 determines an intra-frame error distribution rate and an inter-frame error distribution rate based on the HPF value calculated by the HPF value calculation unit 1101 and the average value calculated by the average value calculation unit 1509, and also determines a weight value used to weight each pixel. The image processing device 300 further includes a multiplier 110, a multiplier 111, an intra-frame error storage unit 107, and an inter-frame error storage unit 108. The multiplier 110 multiplies an output from the subtracter 109 by the intra-frame error distribution rate. The multiplier 111 multiplies an output from the subtracter 109 by the inter-frame error distribution rate. The intra-frame error storage unit 107 stores an output of the multiplier 110. The inter-frame error storage unit 108 stores an output of the multiplier 111.

As shown in FIG. 14, the average value calculation unit 1509 receives an input video signal, an output from the dot storage unit 102, and an output from the line storage unit 103, and outputs an average of pixel values, each of which indicates brightness.

The weight determination unit 1504 receives the HPF value output from the HPF value calculation unit 1101 and the average value output from the average value calculation unit 1509, and outputs a weight value used to weight each pixel, which is determined based on the rate (intra-frame error distribution rate) at which an error is distributed to unprocessed pixels of the I-th frame, to the multiplier 110. The weight determination unit 1504 also outputs a weight value used to weight each pixel, which is determined by the rate (inter-frame error distribution rate) at which an error is distributed to pixels of the (I+1)th frame, to the multiplier 111.

3.2 Operation of the Image Processing Device

The operation of the present embodiment that is the same as the operation of the above embodiments will not be described in detail. The image processing device of the present embodiment differs from the image processing devices of the above embodiments in the average value calculation unit 1509 and the weight determination unit 1504.

The average value calculation unit 1509 of the present embodiment will now be described.

The average value calculation unit 1509 calculates the average of pixel values of pixels included in a single block consisting of a target pixel and its neighboring pixels. For example, the average value calculation unit 1509 processes a block consisting of 3*3 pixels. After calculating the average value of the single block, the average value calculation unit 1509 calculates an average value of a next block consisting of a new target pixel, which is adjacent to the previous target pixel, and neighboring pixels of the new target pixel. After processing a single line of pixels by setting each pixel as a new target pixel in this manner, the average value calculation unit 1509 then moves to a next line, and calculates an average value of each block of pixels in the same manner as described above.

The weight determination unit 1504 of the present embodiment will now be described.

FIG. 7 is a flowchart illustrating the processing performed by the weight determination unit 1504.

The processing in steps S702 and S703 performed by the weight determination unit 1504 included in the image processing device 300 is the same as the processing in steps S702 and S703 performed by the weight determination unit 104 of the first embodiment and will not be described in detail. Only the processing in step S701 will be described.

In the same manner as in the first embodiment, the weight determination unit 1504 calculates the intra-frame error distribution rate and the inter-frame error distribution rate in step S701 of the present embodiment. The processing in step S701 of the present embodiment differs from the processing in the first embodiment in that the weight determination unit 1504 calculates the two distribution rates based on a value calculated using the degree of pixel value variation of the I-th frame and a value calculated using brightness, although the weight determination unit of the first embodiment calculates the two distribution rates based only on the value calculated using the degree of pixel value variation of the I-th frame.

Figure 15:
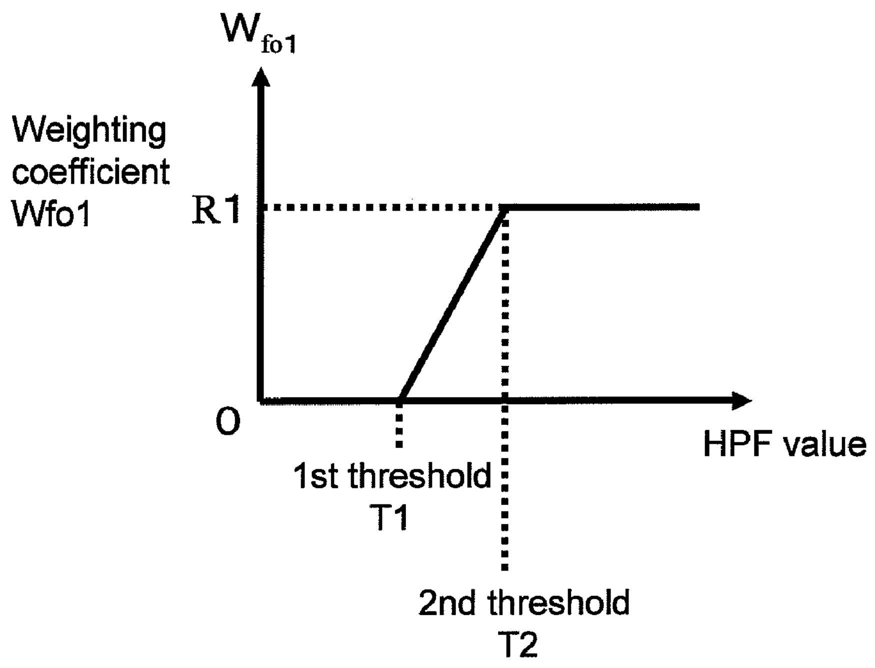
FIG. 15 shows a function used to determine a weighting coefficient using the degree of pixel value variation.

FIG. 15 shows one example of a function used to calculate a weighting coefficient Wfo1, which is calculated based on a value calculated using the degree of pixel value variation. This function is written as formula 3 below.

$$W_{fo1} = \begin{cases} 0 \ \ldots (0 < F \le T1) \\ R1 \cdot (F - T1)/(T2 - T1) \ \ldots (T1 < F \le T2) \\ R1 \ \ldots (T2 < F) \end{cases} \quad \text{Formula 3}$$

$$(0 < R1 \le 1)$$

Figure 16:
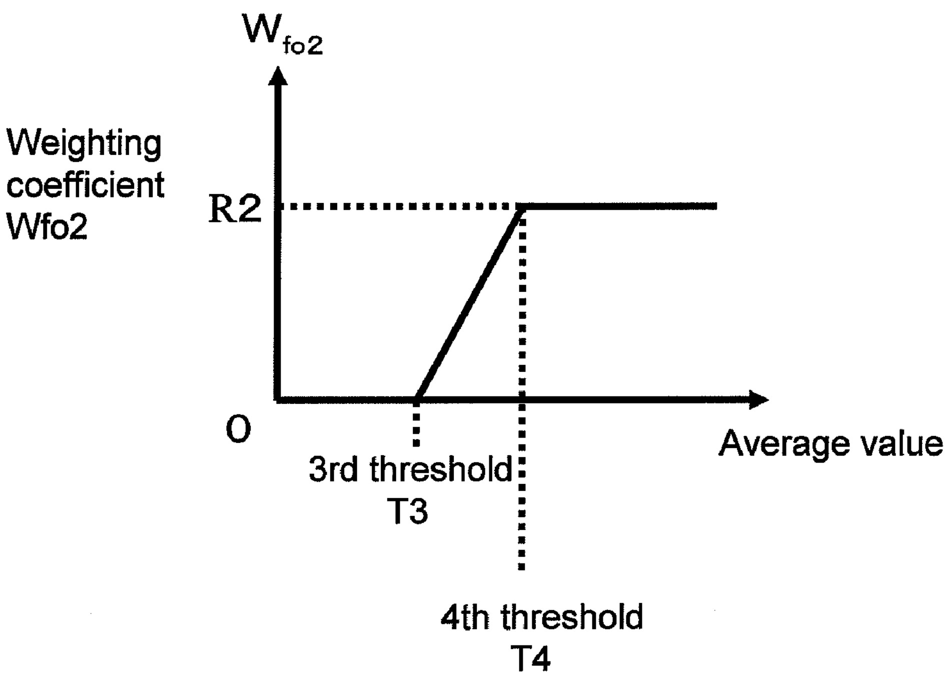
FIG. 16 shows a function used to determine a weighting coefficient using brightness.

FIG. 16 shows one example of a function used to calculate a weighting coefficient Wfo2, which is calculated based on a value calculated using brightness. This function is written as formula 4 below.

$$W_{fo2} = \begin{cases} 0 \ \ldots (0 < F \le T3) \\ R2 \cdot (F - T3)/(T4 - T3) \ \ldots (T3 < F \le T4) \\ R2 \ \ldots (T4 < F) \end{cases} \quad \text{Formula 4}$$

$$(0 < R2 \le 1)$$

The function used to calculate the inter-frame error distribution rate using the two weighting coefficients Wfo1 and Wfo2 is written as formula 5 below.

$$W_{fo} = W_{fo1} \times W_{fo2}$$

$$W_{fi} = 1 - W_{fo} \quad \text{Formula 5}$$

The inter-frame error distribution rate is calculated using this function as 0 for an area with the degree of pixel value variation equal to or smaller than a first threshold, as a value R1 ($R1 \neq 0$) in an area with the degree of pixel value variation greater than a second threshold, and as a value smaller as the degree of pixel value variation is closer to the first threshold in an area with the degree of pixel value variation between the first threshold and a second threshold. Also, the inter-frame error distribution rate is calculated using this function as 0 for an area in which the brightness is smaller than a third threshold, as a value other than 0 in an area in which the brightness is greater than a fourth threshold, and as a value smaller as the brightness is closer to the third threshold in an area in which the brightness is a value between the third threshold and a fourth threshold (step S701).

The image processing device 300 of the present embodiment changes the error distribution rate based on a value calculated using the brightness. According to human sense of vision, human eyes notice changes in a dark part of a video image (image) displayed on a display device more easily than changes in a bright part of the image (more sensitive to changes in the dark part). Considering this fact, the image processing device 300 distributes a smaller error between frames in a darker part (pixels with smaller pixel values (an area consisting of a plurality of pixels with a smaller average pixel value)) than in a brighter part (pixels with larger pixel values (an area consisting of a plurality of pixels with a larger average pixel value)), and distributes no error between frames in a dark part in which flicker is more noticeable with human eyes. As a result, the image processing device 300 uses an error distribution rate set suitable for human sense of vision, and reduces flicker occurring in a video image formed using a video signal (video image displayed by a display device).

The image processing device 300 calculates a value based on brightness of a predetermined area consisting of a target pixel and its neighboring pixels. Using the calculated brightness of the current frame, the image processing device 300 can estimate the brightness of the same area of a next frame.

Also, the image processing device 300 changes the error distribution rate based on a value calculated using the degree of pixel value variation and a value calculated using the brightness. The image processing device 300 with this structure can estimate a plurality of consecutive frames each including an area consisting of pixels with small pixel value variations in a dark part. The image processing device 300 distributes no error between frames when detecting this flicker noticeable condition (a plurality of consecutive frames each including an area consisting of pixels with small pixel value variations in a dark part), and effectively reduces flicker occurring in a video image formed using a video signal (video image displayed by a display device).

Other Embodiments

Although the above embodiments describe the processing performed in units of frames, the processing may instead be performed in units of fields.

Although the present invention has been described based on the embodiments, the present invention should not be limited to the above embodiments. For example, the above embodiments of the present invention may be modified in the following forms.

(1) The device described in each of the above embodiments is specifically a computer system including a microprocessor, a read-only memory (ROM), and a random-access memory (RAM). The RAM stores a computer program. The functions of the device in each embodiment are implemented by the microprocessor operating in accordance with the computer program. The computer program includes a plurality of instruction codes indicating commands to be processed by a computer.

(2) Some or all of the components of the device described in each of the above embodiments may be formed using a single system LSI (large scale integration). The system LSI is a super-multifunctional LSI circuit, which is fabricated by integrating a plurality of components on a single chip, and specifically a computer system including a microprocessor, a ROM, and a RAM. The RAM stores a computer program. The functions of the system LSI are implemented by the microprocessor operating in accordance with the computer program.

(3) Some or all of the components of the device described in each of the above embodiments may be formed using an integrated circuit (IC) card or a standalone module. The IC card or the module is a computer system including a microprocessor, a ROM, and a RAM. The IC card or the module may include the super-multifunctional LSI. The functions of the IC card or the module are implemented by the microprocessor operating in accordance with a computer program. The IC card or the module may be tamper-resistant.

(4) The present invention may be the method described in each of the above embodiments. The present invention may also be a computer program that is used by a computer to implement the method described in each embodiment, or may be a digital signal representing the computer program.

The present invention may also be a computer-readable recording medium storing the computer program or the digital signal. Examples of such a computer-readable recording medium include a flexible disk, a hard disk, a CD-ROM, an MO, a DVD, a DVD-ROM, a DVD-RAM, a Blu-ray Disc (BD), and a semiconductor memory.

The present invention may also be the digital signal stored in such a recording medium.

The present invention may also be the computer program or the digital signal transmitted via an electric communication line, a wireless or cable communication line, a network represented by the Internet, or data broadcasting.

The present invention may also be a computer system including a microprocessor and memory. The memory may store the computer program. The microprocessor may operate in accordance with the computer program.

The present invention may be the program or the digital signal stored in the recording medium and transferred to and implemented by another standalone computer system.

The program or the digital signal may be transferred via the network and implemented by another standalone computer system.

(5) The above embodiments and modifications may be combined.

The processes described in each of the above embodiments may be implemented by either hardware or software, or may be implemented by both software and hardware. When the image processing device of each of the above embodiments is implemented by software, some components of the image processing device, such as the delay unit 112 arranged as a preceding circuit of the error addition unit 105 for timing adjustment, may be eliminated. When the image processing device of each of the above embodiments is implemented by hardware, the image processing device requires timing adjustment for each of its processes. For ease of explanation, timing adjustment associated with various signals required in an actual hardware design is not described in detail in the above embodiments.

The structures described in detail in the above embodiments are mere examples of the present invention, and may be changed and modified variously without departing from the scope and spirit of the invention.

INDUSTRIAL APPLICABILITY

The image processing device of the present invention changes the error distribution rate according to a value calculated using the degree of pixel value variation across an area consisting of a target pixel and its neighboring pixels, and differentiates a flicker-noticeable area and other areas and changes the error distribution rate, and produces a video image with reduced flicker and with good reproducibility of tone levels. The image processing device is therefore applicable to a display device, such as a TV broadcast receiver and a projector.

The invention claimed is:

1. An image processing device that diffuses an error generated at a target pixel when converting a first video signal having M tone levels to a second video signal having N tone levels by restricting the tone levels of the first video signal to the N tone levels, where N<M, and M and N are natural numbers, the device comprising:

a pixel variation information obtaining unit operable to obtain pixel variation information based on a degree of pixel value variation using pixel values in a predetermined area consisting of the target pixel included in a first frame that is formed using the first video signal and two or more neighboring pixels of the target pixel;

a weight determination unit operable to determine, based on the pixel variation information, an intra-frame error distribution rate that is used to distribute the error generated at the target pixel within the first frame and an inter-frame error distribution rate that is used to distribute the error generated at the target pixel to a second frame different from the first frame, and determine, based on the intra-frame error distribution rate and the inter-frame error distribution rate, an intra-frame error distribution weight that is used to weight each of the neighboring pixels that are included in the first frame and an inter-frame error distribution weight that is used to weight a target pixel that is included in the second frame and is at a position identical to a position of the target pixel included in the first frame and neighboring pixels that are included in the second frame and are at positions identical to the neighboring pixels included in the first frame; and an error diffusion unit operable to distribute the error generated at the target pixel to the neighboring pixels included in the first frame based on the intra-frame error distribution rate and the intra-frame error distribution weight, and distribute the error generated at the target pixel to the target pixel included in the second frame and the neighboring pixels included in the second frame based on the inter-frame error distribution rate and the inter-frame error distribution weight.

2. The image processing device according to claim 1, wherein the error diffusion unit includes a first multiplier operable to multiply, for each neighboring pixel to which the error is distributed within the first frame, a result of multiplication of the intra-frame error distribution rate and the intra-frame error distribution weight that are determined by the weight determination unit by the error generated at the target pixel, a second multiplier operable to multiply, for each of the target pixel included in the second frame and the neighboring pixels included in the second frame, a result of multiplication of the inter-frame error distribution rate and the inter-frame error distribution weight that are determined by the weight determination unit by the error generated at the target pixel, an intra-frame error storage unit operable to store a result of the multiplication performed by the first multiplier together with information about a pixel position of each neighboring pixel to which the error is distributed within the first frame, an inter-frame error storage unit operable to store a result of the multiplication performed by the second multiplier together with information about a pixel position of each of the target pixel included in the second frame and the neighboring pixels included in the second frame to which the error is distributed within the second frame, and an error addition unit operable to add, to a pixel to which an error is to be added, an error that is stored in the intra-frame error storage unit as an error to be added to a pixel at a pixel position identical to a pixel position of the target pixel when a pixel position of the pixel to which the error is to be added coincides with the pixel position of any of the neighboring pixels stored in the intra-frame error storage unit, and add, to a pixel to which an error is to be added, an error that is stored in the inter-frame error storage unit as an error to be added to a pixel at a pixel position identical to a pixel position of the target pixel when a pixel position of the pixel to which the error is to be added coincides with the pixel position of any of the target pixel included in the second frame and the neighboring pixels included in the second frame stored in the inter-frame error storage unit.

3. The image processing device according to claim 1, wherein the second frame is a frame that follows the first frame.

4. The image processing device according to claim 1, wherein a sum of the intra-frame error distribution rate and the inter-frame error distribution rate is 1.

5. The image processing device according to claim 1, wherein the weight determination unit determines the inter-frame error distribution rate as 0 when a value of the pixel variation information obtained by the pixel variation information obtaining unit is smaller than a first threshold.

6. The image processing device according to claim 1, wherein the weight determination unit determines the inter-frame error distribution rate as a value greater than 0 when a value of the pixel variation information obtained by the pixel variation information obtaining unit is equal to or greater than a first threshold.

7. The image processing device according to claim 1, wherein the weight determination unit determines the inter-frame error distribution rate as a smaller value as a value of the pixel variation information obtained by the pixel variation information obtaining unit is closer to a first threshold when the value of the pixel variation information is a value between the first threshold and a second threshold greater than the first threshold.

8. The image processing device according to claim 1, wherein the pixel variation information obtaining unit calculates the pixel variation information based on a variance of pixel values in the predetermined area.

9. The image processing device according to claim 1, wherein the pixel variation information obtaining unit calculates the pixel variation information based on a frequency element of the predetermined area.

10. The image processing device according to claim 1, further comprising:

a brightness calculation unit operable to calculate a brightness value that is a value based on brightness using pixel values of the pixels included in the predetermined area consisting of the target pixel and the neighboring pixels in the first frame, wherein the weight determination unit determines the intra-frame error distribution rate, the inter-frame error distribution rate, the intra-frame error distribution weight, and the inter-frame error distribution weight based on the brightness value and the pixel variation information.

11. The image processing device according to claim 10, wherein the weight determination unit determines the inter-frame error distribution rate as 0 when the brightness value is smaller than a third threshold.

12. The image processing device according to claim 10, wherein the weight determination unit determines the inter-frame error distribution rate as a value greater than 0 when the brightness value is equal to or greater than a third threshold.

13. The image processing device according to claim 10, wherein the weight determination unit determines the inter-frame error diffusion rate as a smaller value as the brightness value is closer to a third threshold when the brightness value is a value between the third threshold and a fourth threshold greater than the third threshold.

14. The image processing device according to claim 10, wherein the brightness calculation unit calculates the brightness value based on an average value of pixel values of the pixels included in the predetermined area.

15. A display device, comprising:

the image processing device according to claim 1.

16. A plasma display device, comprising:

the image processing device according to claim 1.

17. An image processing method for diffusing an error generated at a target pixel when converting a first video signal having M tone levels to a second video signal having N tone levels by restricting the tone levels of the first video signal to the N tone levels, where N<M, and M and N are natural numbers, the method comprising:

obtaining pixel variation information based on a degree of pixel value variation using pixel values in a predetermined area consisting of the target pixel included in a first frame that is formed using the first video signal and two or more neighboring pixels of the target pixel;

determining, based on the pixel variation information, an intra-frame error distribution rate that is used to distribute the error generated at the target pixel within the first frame and an inter-frame error distribution rate that is used to distribute the error generated at the target pixel to a second frame different from the first frame, and determining, based on the intra-frame error distribution rate and the inter-frame error distribution rate, an intra-frame error distribution weight that is used to weight each of the neighboring pixels that are included in the first frame and an inter-frame error distribution weight that is used to weight a target pixel that is included in the second frame and is at a position identical to a position of the target pixel included in the first frame and neighboring pixels that are included in the second frame and are at positions identical to the neighboring pixels included in the first frame; and distributing the error generated at the target pixel to the neighboring pixels included in the first frame based on the intra-frame error distribution rate and the intra-frame error distribution weight, and distributing the error generated at the target pixel to the target pixel included in the second frame and the neighboring pixels included in the second frame based on the inter-frame error distribution rate and the inter-frame error distribution weight.

18. An integrated circuit that diffuses an error generated at a target pixel when converting a first video signal having M tone levels to a second video signal having N tone levels by restricting the tone levels of the first video signal to the N tone levels, where N<M, and M and N are natural numbers, the integrated circuit comprising:

a pixel variation information obtaining unit operable to obtain pixel variation information based on a degree of pixel value variation using pixel values in a predetermined area consisting of the target pixel included in a first frame that is formed using the first video signal and two or more neighboring pixels of the target pixel;

a weight determination unit operable to determine, based on the pixel variation information, an intra-frame error distribution rate that is used to distribute the error generated at the target pixel within the first frame and an inter-frame error distribution rate that is used to distribute the error generated at the target pixel to a second frame different from the first frame, and determine, based on the intra-frame error distribution rate and the inter-frame error distribution rate, an intra-frame error distribution weight that is used to weight each of the neighboring pixels that are included in the first frame and an inter-frame error distribution weight that is used to weight a target pixel that is included in the second frame and is at a position identical to a position of the target pixel included in the first frame and neighboring pixels that are included in the second frame and are at positions identical to the neighboring pixels included in the first frame; and an error diffusion unit operable to distribute the error generated at the target pixel to the neighboring pixels included in the first frame based on the intra-frame error distribution rate and the intra-frame error distribution weight, and distribute the error generated at the target pixel to the target pixel included in the second frame and the neighboring pixels included in the second frame based on the inter-frame error distribution rate and the inter-frame error distribution weight.

* * * * *